United States Patent [19]
Saito et al.

[11] Patent Number: 5,414,822
[45] Date of Patent: May 9, 1995

[54] METHOD AND APPARATUS FOR BRANCH PREDICTION USING BRANCH PREDICTION TABLE WITH IMPROVED BRANCH PREDICTION EFFECTIVENESS

[75] Inventors: Mitsuo Saito, Yokosuka; Takeshi Aikawa, Chofu; Junji Mori, Fujisawa, all of Japan

[73] Assignee: Kabushiki Kaisha Toshiba, Kawasaki, Japan

[21] Appl. No.: 863,181

[22] Filed: Apr. 3, 1992

[30] Foreign Application Priority Data

Apr. 5, 1991 [JP] Japan .................................. 3-073329

[51] Int. Cl.⁶ .............................................. G06F 9/38
[52] U.S. Cl. .................................... 395/375; 395/800; 364/261.3; 364/253; 364/DIG. 1
[58] Field of Search ................. 395/800, 425, 375, 775

[56] References Cited

U.S. PATENT DOCUMENTS

| | | | |
|---|---|---|---|
| 5,136,697 | 8/1992 | Johnson | 395/375 |
| 5,142,634 | 8/1992 | Fite et al. | 395/375 |
| 5,226,130 | 7/1993 | Favor et al. | 395/375 |
| 5,276,882 | 1/1994 | Emma et al. | 395/700 |
| 5,283,873 | 2/1994 | Steely, Jr. et al. | 395/375 |

OTHER PUBLICATIONS

Technical Report No. CSL-TR-91-480, Jun. 1991, pp. 1-21, B. K. Bray, et al., "Strategies For Branch Target Buffers".

*Primary Examiner*—Alyssa H. Bowler
*Assistant Examiner*—Alpesh M. Shah
*Attorney, Agent, or Firm*—Oblon, Spivak, McClelland, Maier, & Neustadt

[57] ABSTRACT

The branch prediction using a branch prediction table formed by an associative memory which is applicable to a super scalar processor without causing confusion in the branch prediction. The branch prediction uses a branch prediction table for registering entries, each entry including a branching address, a branch target address, and an instruction position indicating a position of the predicted branch instruction in group of instructions to be executed concurrently, or an entry address indicating a position of each entry in the associative memory of the table. A correctness of the predicted branch instruction is checked by using actual branch target address and/or actual instruction position of actual branch instruction encountered in the actual execution of presently fetched instructions. When the predicted branch instruction is incorrect, instructions fetched at a next processing timing are invalidated and the entry in the table is rewritten.

21 Claims, 19 Drawing Sheets

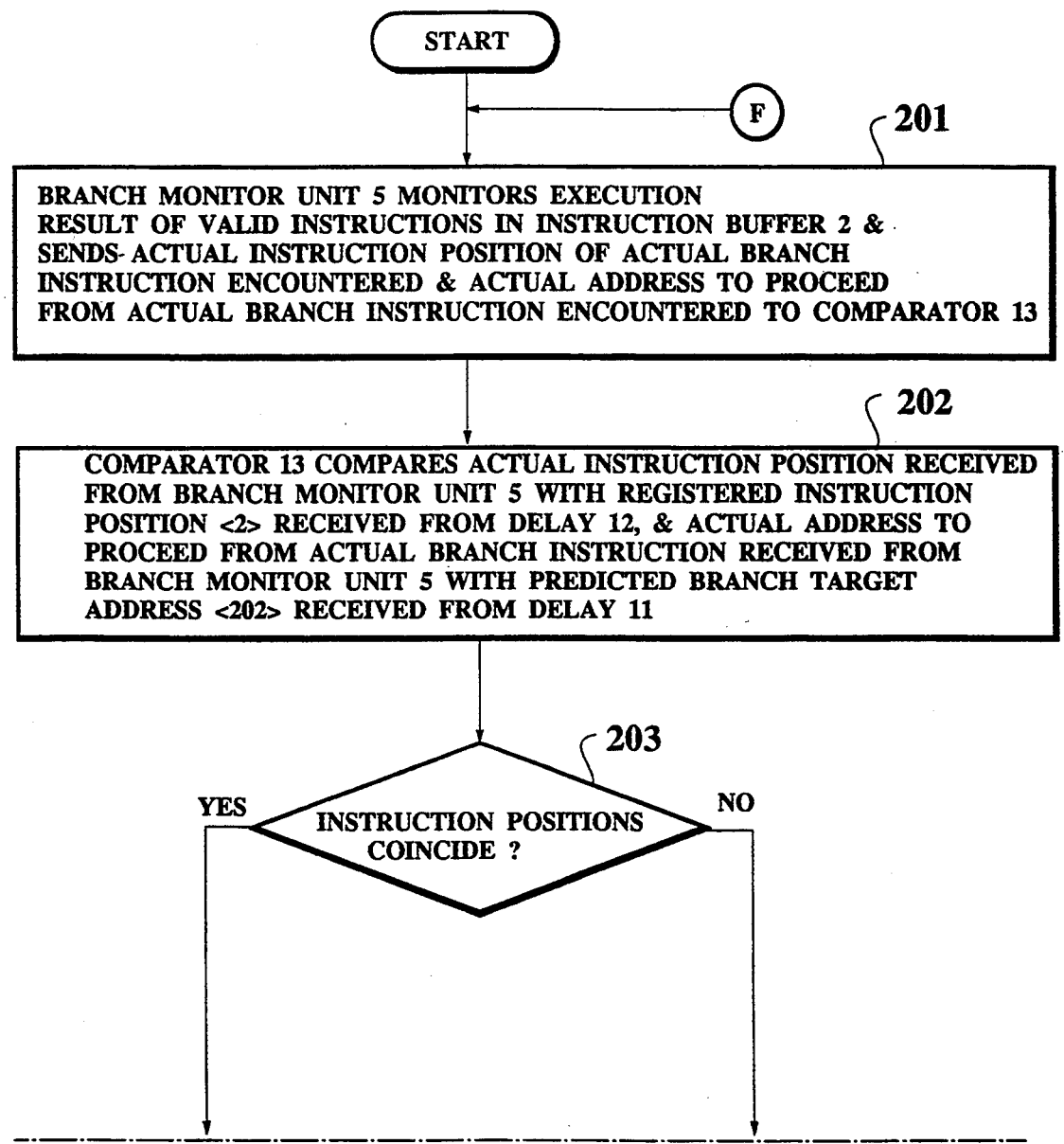

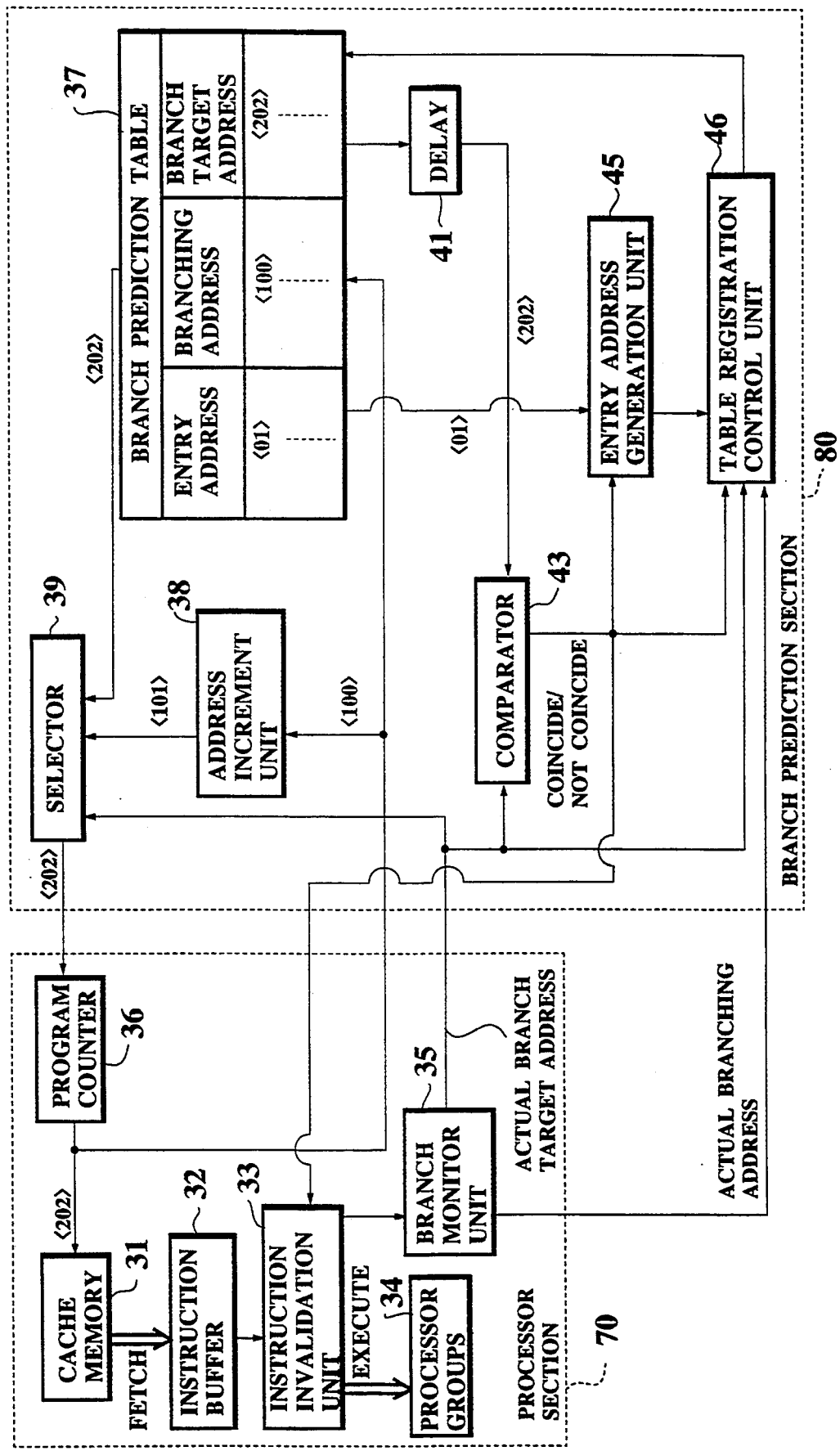

METHOD AND APPARATUS FOR BRANCH PREDICTION USING BRANCH PREDICTION TABLE WITH IMPROVED BRANCH PREDICTION EFFECTIVENESS

BACKGROUND OF THE INVENTION

1. Field of the Invention

The present invention relates to a branch prediction in a computer, and more particularly, to a branch prediction suitable for a type of a computer called a super scalar processor capable of concurrent execution of multiple instructions.

2. Description of the Background Art

The use of a branch prediction table (also known as a branch target buffer) has been conventionally known as an effective method for speeding up the branching processes in a computer, and has been utilized in a commercially available computer such as the AM 29000 microprocessor of AMD corporation for example.

Such a conventional branch prediction table operates on a simple principle that, when a branch instruction is executed, the branching address and the branch target address are registered in pair into the branch prediction table, such that when the same branch instruction is fetched next time, the instruction of the appropriate branch target can be fetched at a next process timing immediately following the fetch of the branch instruction, before the actual execution of the branch instruction, according to the branch target address corresponding to the branching address of that branch instruction which is registered in the branch prediction table, so that the branch process for that branch instruction can be carried out at higher speed. The correctness of the branch target predicted according to the branch prediction table is checked at a time of actually executing the branch instruction, and when the predicted branch target is incorrect, the corrected fetching of the appropriate branch target is carried out after the actual execution of the branch instruction.

Conceptually, in order to improve the effectiveness of such a branch prediction table, it is desirable to form the branch prediction table by a full associative or a multi-way associative memory which can register the same address at an arbitrary position in the memory.

However, when this type of a memory is used in a conventional branch prediction table, there is a possibility for an occurrence of a so called multi-entry in which the identical data are registered at a plurality of positions in the memory, which can lead to a confusion in the branch prediction.

Also, recently, a type of a computer called a VLIW (Very Long instruction Word) or a super scalar processor which is capable of concurrent execution of multiple instructions has been developed. In this type of a computer, because a plurality of instructions are going to be executed concurrently, a group of instructions to be executed concurrently is collectively fetched by using an address of one instruction in the group, so that even when there is a branch instruction in the group, the address used in fetching this group of instructions itself may not necessarily indicate the address of the branch instruction in the group. For this reason, it has been impossible to achieve the proper branch prediction by simply applying the conventional branch prediction table as described above to such a super scalar processor.

Moreover, it has also been difficult for a processor of super scalar type to adopt another conventionally known method for speeding up the branching process in a computer called delayed instructions in which the executions of the instructions which are located before the branch instruction but may very well be executed after the execution of the branch instruction are delayed in advance to the process timings after the execution of the branch instruction, because the number of delayed instructions required for each branch instruction is practically too large.

SUMMARY OF THE INVENTION

It is therefore an object of the present invention to provide a method and an apparatus for branch prediction using a branch prediction table formed by an associative memory such that the branch prediction can be carried out more effectively at higher speed.

It is another object of the present invention to provide a method and an apparatus for branch prediction using a branch prediction table which is applicable to a processor of super scalar type without causing confusion in the branch prediction.

According to one aspect of the present invention there is provided an apparatus for branch prediction, comprising: processor means for executing a group of instructions concurrently; branch prediction table means for registering entries, each entry including a branching address indicating a group of instructions containing a predicted branch instruction, a branch target address of the predicated branch instruction, and an instruction position indicating a position of the predicted branch instruction in the group of instructions indicated by the branching address; instruction fetch means for fetching the group of instructions to be executed concurrently by the processor means, which fetches the group of instructions indicated by a branch target address of a predicted branch instruction for presently fetched group of instructions at a next processing timing, where the predicted branch instruction for the presently fetched group of instructions is registered in an entry in the branch prediction table means having a branching address which coincides with an address of the presently fetched group of instructions; prediction judge means for judging the predicted branch instruction for the presently fetched group of instructions as correct when the predicted branch instruction is actually encountered in an actual execution of the presently fetched group of instructions; and predicted instruction invalidation means for invalidating the group of instructions indicated by the branch target address of the predicted branch instruction for the presently fetched group of instructions which are fetched by the instruction fetch means at the next processing timing, when the prediction judge means does not judge the predicted branch instruction as correct.

According to another aspect of the present invention there is provided an apparatus for branch prediction, comprising: processor means for executing instructions; branch prediction table means formed by an associative memory for registering entries, each entry including a branching address indicating instructions to be executed concurrently containing a predicted branch instruction, a branch target address of the predicated branch instruction, and an entry address indicating a position of said each entry in the associative memory of the branch prediction table means; instruction fetch means for fetching the instructions to be executed concurrently by the processor means, which fetches the instructions indicated by a branch target address of a predicted branch instruction for presently fetched instructions at a next processing timing, where the predicted branch instruction for the presently fetched instructions is registered in an entry in the branch prediction table means having a branching address which coincides with an address of the presently fetched instructions; prediction judge means for judging the predicted branch instruction for the presently fetched instructions as correct when the predicted branch instruction is actually encountered in an actual execution of the presently fetched instructions; predicted instruction invalidation means for invalidating the instructions indicated by the branch target address of the predicted branch instruction for the presently fetched instructions which are fetched by the instruction fetch means at the next processing timing, when the prediction judge means does not judge the predicted branch instruction as correct; and table registration means for rewriting the entry registering the predicted branch instruction for the presently fetched instructions in the branch prediction table means when the prediction judge means does not judge the predicted branch instruction as correct by using the entry address of the entry registering the predicted branch instruction for the presently fetched instructions.

According to another aspect of the present invention there is provided a method of branch prediction for a processor capable of executing a group of instructions concurrently, comprising the steps of: providing a branch prediction table for registering entries, each entry including a branching address indicating a group of instructions containing a predicated branch instruction, a branch target address of the predicated branch instruction, and an instruction position indicating a position of the predicted branch instruction in the group of instructions indicated by the branching address; fetching the group of instructions to be executed concurrently by the processor which are indicated by a branch target address of a predicted branch instruction for presently fetched group of instructions at a next processing timing, where the predicted branch instruction for the presently fetched group of instructions is registered in an entry in the branch prediction table means having a branching address which coincides with an address of the presently fetched group of instructions; actually executing the group of instructions fetched at the fetching step by the processor concurrently; judging that the predicted branch instruction for the presently fetched group of instructions as correct when the predicted branch instruction is actually encountered in an actual execution of the presently fetched group of instructions at the actually executing step; and invalidating the group of instructions indicated by the branch target address of the predicted branch instruction for the presently fetched group of instructions which are fetched at the fetching step at the next processing timing, when the predicted branch instruction is not judged as correct at the judging step.

According to another aspect of the present invention there is provided a method of branch prediction, comprising the steps of: providing a branch prediction table formed by an associative memory for registering entries, each entry including a branching address indicating instructions to be executed concurrently containing a predicted branch instruction, a branch target address of the predicated branch instruction, and an entry address indicating a position of said each entry in the associative memory of the branch prediction table; fetching the instructions to be executed concurrently by a processor which are indicated by a branch target address of a predicted branch instruction for presently fetched instructions at a next processing timing, where the predicted branch instruction for the presently fetched instructions is registered in an entry in the branch prediction table having a branching address which coincides with an address of the presently fetched instructions; actually executing the instructions fetched at the fetching step by the processor concurrently; judging the predicted branch instruction for the presently fetched instructions as correct when the predicted branch instruction is actually encountered in an actual execution of the presently fetched instructions at the actually executing step; invalidating the instructions indicated by the branch target address of the predicted branch instruction for the presently fetched instructions which are fetched at the fetching step at the next processing timing, when the predicted branch instruction is not judged as correct at the judging step; and rewriting the entry registering the predicted branch instruction for the presently fetched instructions in the branch prediction table when the predicted branch instruction is not judged as correct at the judging step, by using the entry address of the entry registering the predicted branch instruction for the presently fetched instructions.

Other features and advantages of the present invention will become apparent from the following description taken in conjunction with the accompanying drawings.

BRIEF DESCRIPTION OF THE DRAWINGS

FIG. 4 is a block diagram of the second embodiment of an apparatus for branch prediction according to the present invention.

DETAILED DESCRIPTION OF THE PREFERRED EMBODIMENTS

Figure 1:
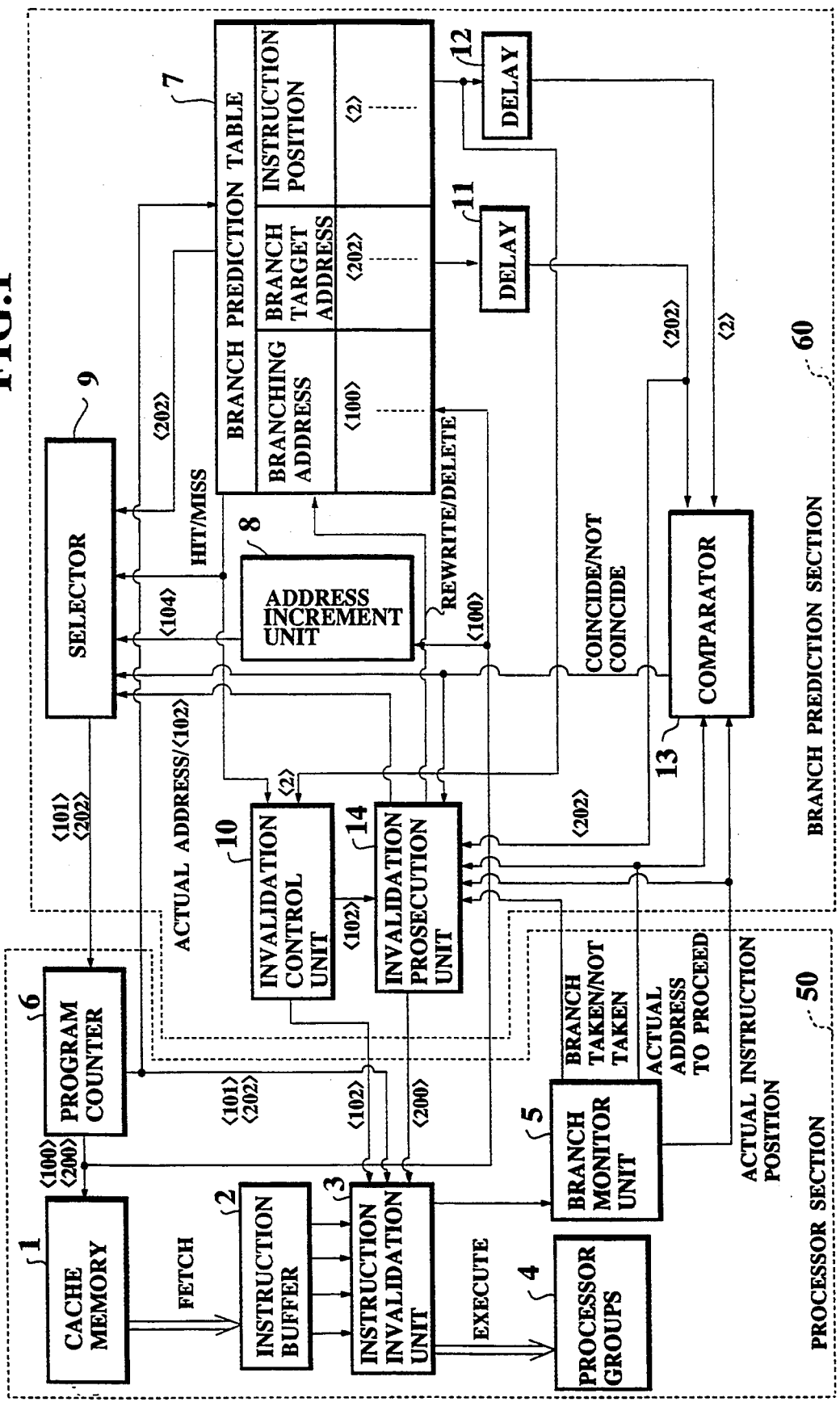
FIG. 1 is a block diagram of the first embodiment of an apparatus for branch prediction according to the present invention.

Referring now to FIG. 1, the first embodiment of an apparatus for branch prediction according to the present invention will be described in detail. This first embodiment is suitable for a super scalar type processor which is capable of concurrent execution of multiple instructions.

In this first embodiment, the apparatus generally comprises a processor section 50 and a branch prediction section 60.

The processor section 50 further comprises: a cache memory 1 for storing instructions to be executed; an instruction buffer 2 for storing the instructions to be executed next which are fetched from the cache memory 1; an instruction invalidation unit 3 capable of invalidating selected ones of the instructions stored in the instruction buffer 2; a processor groups 4 for actually executing the instructions; a branch monitor unit 5 for monitoring the execution result of the instructions not invalidated at the instruction invalidation unit 3; and a program counter 6 for specifying the address of the instructions to be fetched next from the cache memory 1.

In the following description, for the sake of concrete explanation, the processor groups 4 is assumed to form a super scalar type processor, and is assumed to be capable of concurrent execution of four instructions at a time, so that a group of four instructions are fetched to the instruction buffer 2 at a time. Here, each group of the instructions to be fetched concurrently is identified by the address of the top one among the instructions of the group, so that when the instructions with addresses <100> to <103> are fetched concurrently, this group of instructions is identified by the address <100> of the top one among the instructions of this group.

The branch prediction section 60 further comprises: a branch prediction table 7 formed by a full associative memory for storing branch prediction table entries, where each entry includes a branching address, its corresponding branch target address, and its corresponding instruction position indicating a position of the branch instruction in the group of the instructions identified by the branching address, which are registered in the branch prediction table 7 according to the actual branch instructions encountered in the past; an address increment unit 8 for adding increment in unit of four to the address of the last fetched instructions; a selector 9 for selecting an appropriate one of the addresses supplied, and supplying the selected address to the program counter 6 as the address of the instructions to be fetched next; an invalidation control unit 10 for controlling the instruction invalidation unit 8 to invalidate the selected ones of the instructions stored in the instruction buffer 2 at a time of the instruction fetch; a delay 11 for delaying the transmission of the branch target address read out from the branch prediction table 7; a delay 12 for delaying the transmission of the instruction position read out from the branch prediction table 7; a comparator 13 for comparing the branch target address and the instruction position from the delays 11 and 12 with the actual address to proceed and the actual instruction position of the actually encountered branch instruction reported from the branch monitor unit 5; and an invalidation prosecution unit 14 for controlling the invalidation of the instructions stored in the instruction buffer 2 by the instruction invalidation unit 8, the selection of the address at the selector 9, and the rewriting or deleting of the entries in the branch prediction table 7, at a time of the instruction execution in a case of the incorrect branch prediction.

Figure 2:
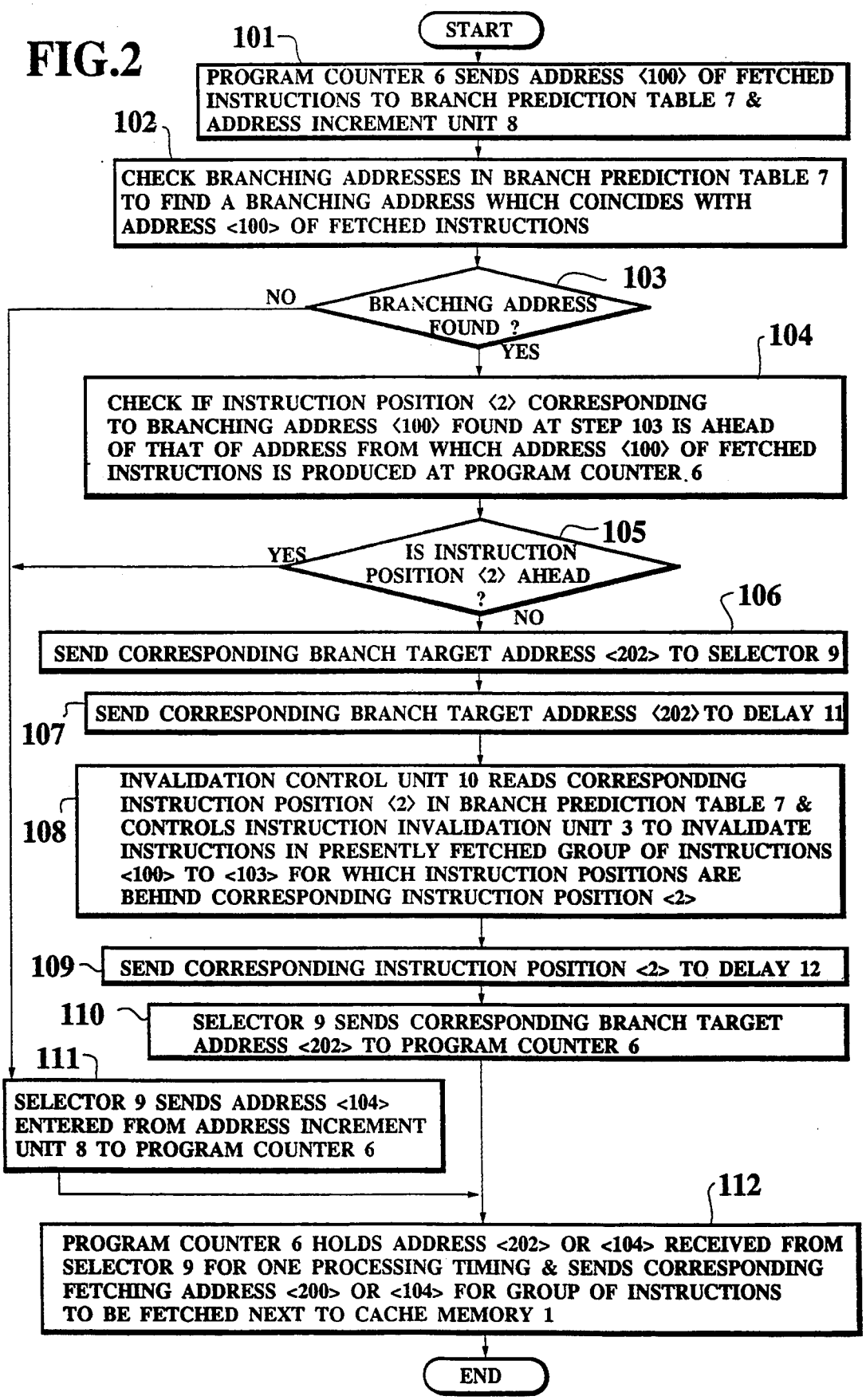
FIG. 2 is a flow chart for an operation of the branch prediction apparatus of FIG. 1 at a time of fetching an instruction.
Figure 3B:
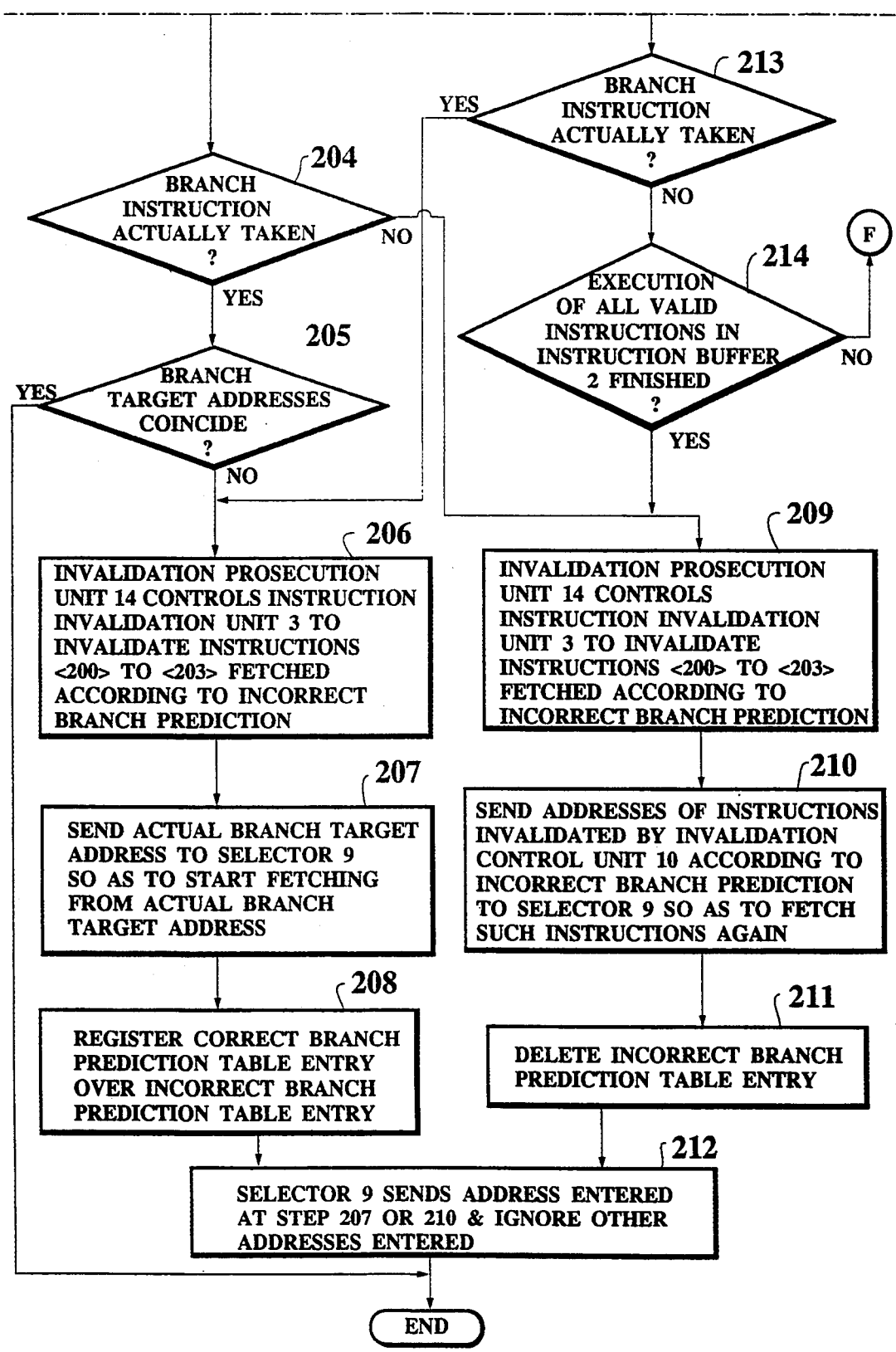
FIG. 3 is a flow chart for an operation of the branch prediction apparatus of FIG. 1 at a time of executing an instruction.

Referring now to FIGS. 2 and 3, the actual procedure for the operation of this apparatus of FIG. 1 will be described in detail. In the following, the operation is described for a concrete situation in which the instructions <100> to <103> are fetched presently, and the branch prediction is carried out on a basis of the entry indicating <100> for the branching address, <202> for the corresponding branch target address, and <2> for the corresponding instruction position.

First, the operation at a time of the instruction fetch is carried out according to the flow chart of FIG. 2, as follows.

At the step 101, the program counter 6 sends the address <100> of the group of instructions presently fetched at the instruction buffer 2 to the branch prediction table 7 and the address increment unit 8. In response, the address increment unit 8 adds the increment in unit of four to the address <100> of the presently fetched group of instructions, and sends the obtained new address <104> which is going to be selected by the selector when there is no branch prediction, to the selector 9.

Next, at the step 102, the branching addresses registered in the branch prediction table 7 are checked to find a registered branching address which coincides with the address <100> of the presently fetched group of instructions.

When such a registered branching address is found at the next step 103, the branch prediction table 7 sends the signal indication the hit to the selector 9 and the invalidation control unit 10 and the operation proceeds to the step 104, whereas otherwise the branch prediction table 7 sends the signal indicating the miss to the selector 9 and the invalidation control unit 10 and the operation proceeds to the step 111. In the situation depicted in FIG. 1, there is an entry with the branching address <100>, for which the corresponding branch target address is <202> and the corresponding instruction position is <2>, so that the step 104 will be taken next in such a situation.

At the step 104, the branch prediction table 7 are checked to see if the instruction position <2> corresponding to the branching address <100> found at the step 103 is ahead of that of an address from which the address <100> of the fetched instructions is produced at the program counter 6 or not. Namely, when the address <100> of the fetched instructions is produced at the program counter 6 from an address <101> supplied by the selector 9 for example, the instruction position <2> of this address <101> and the registered instruction position <2> corresponding to the branching address <100> are compared to see if the registered instruction position <2> is ahead.

When the registered instruction position <2> is found to be ahead at the next step 105, the branch prediction table 7 sends the signal indicating the miss to the selector 9 and the invalidation control unit 10 and the operation proceeds to the step 111, whereas otherwise the branch prediction table 7 sends the signal indicating the hit to the selector 9 and the invalidation control unit 10 and the operation proceeds to the step 106.

This checking of the registered instruction position at the step 104 is provided in order to avoid the possible undesirable prediction of the branching at the address which is ahead of the address <101>, such as an address <100>, according to the branch prediction table 7. In other words, when the entry with the branching address <100> in the branch prediction table 7 has the instruction position <1>, this indicates that the actual branching address is <100>, and since the branch prediction table 7 is accessed by the address <100> for the presently fetched instructions <100> to <103>, the branch prediction based on this entry with the instruction position <1> must be prohibited in a case the instruction at the address <100> is not going to be executed at a time of instruction execution of the group of instructions <100> to <103>, as in a case in which the address <100> of the presently fetched instructions is produced at the program counter 6 from an address <101> supplied by the selector 9. This checking is important when the address from which the address of the presently fetched instructions itself was the branch target address. As can be understood from the following description. in such a case, the branch prediction is not going to be carried out in such a case by proceeding to the step 111, and the instruction invalidation unit 3 will be controlled to invalidate the instructions at the address <100> according to the address <101> supplied from the program counter 6 at the step 112.

It is to be noted that, the checking of the registered instruction position at the step 104 as described above may be replaced by the following. Namely, the branch prediction table 7 may be checked to find a registered branching address to which the branch target address <202> corresponding to the branching address <100> found at the step 103 belongs, and for which the corresponding instruction position is ahead of the instruction position <3> of the branch target address <202> corresponding to the branching address <100> found at the step 108. In a situation of FIG. 1, the entries of the branch prediction table 7 are checked to see if there is an entry with the branching address <200> to which the predicted branch target address <202> for the branching address <100> of interest belongs, and when such an entry is found, then it is checked to see if the instruction position corresponding to such a registered branching address <200> is ahead of the instruction position <3> of the branch target address <202> corresponding to the branching address <100> of interest, i.e., whether the registered instruction position corresponding to the registered branching address <200> is either one of <1> or <2>, or not.

When such a registered branching address is found at the next step 105, the branch prediction table 7 sends the signal indicating the miss to the selector 9 and the invalidation control unit 10 and the operation proceeds to the step 111, whereas otherwise the branch prediction table 7 sends the signal indicating the hit to the selector 9 and the invalidation control unit 10 and the operation proceeds to the step 106.

This checking of the registered branching address to which the branch target address <202> corresponding to the branching address <100> of interest belongs, and for which the corresponding instruction position is ahead of the instruction position <3> of the branch target address <202> corresponding to the branching address <100> of interest at the step 104 is capable of avoiding the possible undesirable prediction of the branching at the addresses <200> or <201> according to the branch prediction table 7 in the next cycle, despite of the fact that the instructions at these addresses <200> and <201> are not going to be executed at a time of instruction execution of the group of instructions <200> to <203> fetched according to the present branch prediction, as the instruction invalidation unit 3 will invalidate the instructions at these address <200> and <201> according to the address <202> supplied from the program counter 6 at the step 112 to be described below. As can be understood from the following description, the branch prediction is not going to be carried out in such a case by proceeding to the step 111.

Next, at the step 106, the predicted branch target address <202> is sent from the branch prediction table 7 to the selector 9, while at the step 107, the predicted branch target address <202> is sent from the branch prediction table 7 to the delay 11. The delay 11 delays the transmission of the predicted branch target address <202> to the comparator 13 until an appropriate timing at which the actual address to proceed from the actually encountered branch instruction is sent from the branch monitor unit 5 to the comparator 13.

Then, at the step 108, the invalidation control unit 10 reads the instruction position <2> of the predicted branch instruction registered in the branch prediction table 7, and controls the instruction invalidation unit 8 to invalidate the instructions in the presently fetched group of instructions <100> to <103> for which the instruction positions are greater than the registered instruction position <2> of the predicted branch instruction. Namely, in a situation of FIG. 1, the instructions <102> and <103> whose instruction positions <3> and <4> are behind the registered instruction position <2> of the predicted branch instruction are invalidated by the instruction invalidation unit 3 because these instructions <102> and <103> should not be executed when the predicted branch instruction is actually taken in which case the process should jump to the instruction <202> next.

Then, at the step 109, the registered instruction position <2> is sent from the branch prediction table 7 to the delay 12. The delay 12 delays the transmission of the registered instruction position <2> to the comparator 13 until an appropriate timing at which the actual instruction position of the actually encountered branch instruction is sent from the branch monitor unit 5 to the comparator 13.

Then, at the step 110, the selector 9 selects the predicted branch target address <202> in accordance with the hit signal from the branch prediction table 7, and sends it to the program counter 6 as the address of the instructions to be fetched from the cache memory 1 next.

On the other hand, when the operation proceeds to the step 111, it implies that no branch prediction is going to be made, so that the selector 9 selects the address <104> entered from the address increment unit 8 in accordance with the miss signal from the branch prediction table 7, and send it to the program counter 6 as the address of the instructions to be fetched from the cache memory 1 next.

Finally, at the step 112, the program counter 6 holds the address <202> or <104> received from the selector 9 for one processing timing, and sends the corresponding fetching address <200> or <104> for identifying the group of instructions to be fetched concurrently next to the cache memory 1. Here, in a case of using the line size of four as in the situation of FIG. 1, in terms of the binary expressions, the fetching address can be obtained by simply dropping last two bit values of the address received from the selector 9. In a case the address received from the selector 9 is the predicted branch target address <202>, the program counter 6 also sends the address <202> to the instruction invalidation unit 3, so as to invalidate the instructions at the addresses <200> and <201> which are not to be executed at a time of next instruction execution.

Now, the operation at a time of the instruction execution is carried out according to the flow chart of FIG. 3, as follows.

First, at the step 201, the branch monitor unit 5 monitors the execution result of the valid instructions in the instruction buffer 2, one by one in an order in which the execution is finished, and sends the actual instruction position of the actual branch instruction encountered during the execution and the actual address to proceed from the actual branch instruction encountered during the execution to the comparator 13.

Then, at the step 202, the comparator 13 compares the actual instruction position of the actually encountered branch instruction received from the branch monitor unit 5 with the registered instruction position <2> of the predicted branch instruction received from the delay 12, and the actual address to proceed from the actually encountered branch instruction received from the branch monitor unit 5 with the predicted branch target address <202> received from the delay 11.

Then, at the step 203, whether the actual instruction position of the actually encountered branch instruction and the registered instruction position <2> of the predicted branch instruction coincide with each other or not is determined by the comparator 13. When they coincide with each other it implies that the branch instruction has actually been encountered at the registered instruction position so that the operation proceeds to the step 204, whereas otherwise It implies that the branch instruction has actually been encountered at an instruction position ahead of the registered instruction position so that the operation proceeds to the step 213.

At the step 204, whether the actual branch instruction has been actually taken or not is determined according to the report from the branch monitor unit 5, and when it is actually taken the operation proceeds to the step 205, whereas otherwise the operation proceeds to the step 209.

At the step 205, whether the actual address to proceed from the actually encountered branch instruction and the predicted branch target address <202> coincide with each other or not is determined by the comparator 13, and when they coincide with each other it implies that the branch prediction has been correct so that the operation continues to the processing with respect to the next instruction, whereas otherwise it implies that the branch prediction has been incorrect and the operation proceeds to the step 206.

When both of the instruction positions and the branch target addresses are found to coincide at the steps 204 and 205 the comparator 13 sends a signal indicating the coincidence to the selector 9 and the invalidation prosecution unit 14, whereas otherwise the comparator 13 sends a signal indicating the non-coincidence to the selector 9 and the invalidation prosecution unit 14.

At the step 206, the invalidation prosecution unit 14 controls the instruction invalidation unit 3 to invalidate the instructions <200> to <203> which are fetched according to the incorrect branch prediction, in accordance to the non-coincidence signal from the comparator 13.

In this case, since the branch instruction has been actually taken, next at the step 207, the invalidation prosecution unit 14 sends the actual branch target address reported from the branch monitor unit S to the selector 9 so as to carry out the fetching from the actual branch target address next.

Then, at the step 208, the invalidation prosecution unit 14 controls the branch prediction table 7 to rewrite the incorrect entry in the branch prediction table 7 to the correct entry indicating the actual branching address, actual branch target address, and actual instruction position. Here, the address <100> supplied from the program counter 6 to the branch prediction table 7 at the step 101 is appropriately delayed and utilized in rewriting the branch prediction table 7.

On the other hand, when the operation proceeds to the step 209, the invalidation prosecution unit 14 controls the instruction invalidation unit 8 to invalidate the instructions <200> to <208> which are fetched according to the incorrect branch prediction, in accordance to the non-coincidence signal from the comparator 18.

In this case, since the branch instruction has not been actually taken, next at the step 210, the invalidation prosecution unit 14 sends the addresses of the instructions which has been erroneously invalidated by the invalidation control unit 10 at a time of the instruction fetch according to the incorrect branch prediction, to the selector 9, so as to carry out the fetching of such erroneously invalidated instructions again next. Here, the program counter 6 also sends the address of the erroneously invalidated instructions to the instruction invalidation unit 3, so as to invalidate the instructions other than the erroneously invalidated instructions which are not to be executed again at a time of next instruction execution.

Also, in this case, since there has been no branch instruction that is actually taken, next at the step 211, the invalidation prosecution unit 14 controls the branch prediction table 7 to delete the incorrect entry in the branch prediction table 7. Here, the address <100> supplied from the program counter 6 to the branch prediction table 7 at the step 101 is appropriately delayed and utilized in deleting the incorrect entry in the branch prediction table 7.

Then, at the step 212, the selector 9 selects the address entered at the step 207 or step 210 and sends it to the program counter 6 as the address of the instructions to be fetched next, while ignoring the other addresses entered from the branch prediction table 7 and the address increment unit 8, and the operation continues to the processing with respect to the next instruction.

On the other hand, when the operation proceeds to the step 213 from the step 203, whether the actual branch instruction has been actually taken or not is determined according to the report from the branch monitor unit 5, and when it is actually taken the operation proceeds to the step 206 described above, whereas otherwise the operation proceeds to the step 214.

At the step 214, whether the execution of all the valid instructions in the instruction buffer 2 has been finished or not is determined. When all the valid instructions has been executed it implies that no branch instruction has actually been encountered so that the operation proceeds to the step 209 described above, whereas otherwise the operation returns to the step 201 described above, so as to have the execution result of the next valid instruction monitored by the branch monitor unit 5.

It is to be noted that when the instructions to be executed in the processor section 50 includes the so called delayed instructions which must be executed even when the branch instruction located ahead of it has actually been taken, the above described operation should be modified as follows.

First of all, at a time of instruction fetch, the instructions to be invalidated by the invalidation control unit 10 at the step 108 should be the instructions in the presently fetched group of instructions <100> to <103> for which the instruction positions are behind by one plus a predetermined delayed instruction number of the registered instruction position <2> of the predicted branch instruction. Here, the delayed instruction number is a fixed number set for the processor section 50 in advance, which is assumed to be one in this embodiment. Thus, for example, in a situation of FIG. 1, only the instruction <103> whose instruction positions <4> is behind by two of the registered instruction position <2> of the predicted branch instruction will be invalidated by the instruction invalidation unit 3.

Here, it is noted that whether the delayed instruction is actually going to be executed or not is unknown at a time of the instruction fetch and cannot be ascertained until the instruction is decoded.

Secondly, at a time of instruction execution, the instructions to be fetched again which are going to be specified at the step 210 should be not just the instructions which has been erroneously invalidated by the invalidation control unit 10 at a time of the instruction fetch according to the incorrect branch prediction, but the delayed instruction which has actually turned out to be the branch instruction and all the instructions located behind this delayed instruction which has actually turned out to be the branch instruction.

As described above, according to this first embodiment, it becomes possible to realize the branch prediction using a branch prediction table which is applicable to a processor of super scalar type without causing confusion in the branch prediction, such that the branch prediction can be carried out more effectively at higher speed.

Referring now to FIG. 4, the second embodiment of an apparatus for branch prediction according to the present invention will be described in derail. This second embodiment is equally applicable to any type of a processor including a super scalar type processor which is capable of concurrent execution of multiple instructions. In the following description, for the sake of simplicity, the processor groups 4 is assumed to be an ordinary processor capable of execution of one instruction at a time, so that one instruction is fetched to the instruction buffer 2 at a time.

In this second embodiment, the apparatus generally comprises a processor section 70 and a branch prediction section 80.

The processor section 70 further comprises: a cache memory 31 for storing instructions to be executed; an instruction buffer 32 for storing the instruction to be executed next which is fetched from the cache memory 31; an instruction invalidation unit 33 for invalidating the instruction stored in the instruction buffer 32 which is fetched according to the incorrect branch prediction; a processor groups 34 for actually executing the instruction; a branch monitor unit 35 for monitoring the execution result of the instruction; and a program counter 36 for specifying the address of the instruction to be fetched next from the cache memory 1.

The branch prediction section 80 further comprises: a branch prediction table 37 formed by a full associative memory for storing branch prediction table entries, where each entry includes a branching address and its corresponding branch target address, which are registered in the branch prediction table 37 according to the actual branch instructions encountered in the past, along with an entry address indicating a position at which the entry is registered in the full associative memory; an address increment unit 38 for adding increment in unit of one to the address of the last fetched instruction; a selector 89 for selecting an appropriate one of the addresses supplied, and supplying the selected address to the program counter 36 as the address of the instruction to be fetched next; a delay 41 for delaying the transmission of the branch target address read out from the branch prediction table 37; a comparator 43 for comparing the branch target address entered from the delay 41 with the actual branch target address reported from the branch monitor unit 35; an entry address generation unit 4S for storing the entry address entered from the branch prediction table 37 and generating a new entry address whenever necessary; and a table registration control unit 46 for rewriting the entry in the branch prediction table 37 by using the entry address entered from the entry address generation unit 45 when the incorrect branch prediction is made.

Now, the actual procedure for the operation of this apparatus of FIG. 4 will be described in detail. In the following, the operation is described for a concrete situation in which the instruction <100> is fetched presently, and the branch prediction is carried out on a basis of the entry indicating <100> for the branching address, <202> for the corresponding branch target address, and <01> for the entry address.

First, the program counter 36 sends the address <100> of the instruction presently fetched at the instruction buffer 32 to the branch prediction table 37 and the address increment unit 38. In response, the address increment unit 38 adds the increment in unit of one to the address <100> of the presently fetched instruction, and sends the obtained new address <101> which is going to be selected by the selector 39 when there is no branch prediction, to the selector 39.

Meanwhile, at the branch prediction table 37, the branching addresses registered in the branch prediction table 37 are checked to find a registered branching address which coincides with the address <100> of the presently fetched instruction.

When such a registered branching address is found, the corresponding predicted branch target address <202> is sent from the branch prediction table 37 to the selector 39 as well as to the delay 41, while the corresponding entry address <01> is sent to the entry address generation unit 45.

The delay 41 delays the transmission of the predicted branch target address <202> to the comparator 43 until an appropriate timing at which the actual branch target address is sent from the branch monitor unit 35 to the comparator 43.

Then, the selector 39 selects the predicted branch target address <202> and sends it to the program counter 36 as the address of the instructions to be fetched next.

On the other hand, when no registered branching address coinciding with the address of the presently fetched instruction is found in the branch prediction table 37, the selector 89 selects the address <101> entered from the address increment unit 38 and sends it to the program counter 36 as the address of the instructions to be fetched next.

Then, the program counter 86 holds the address <202> or <101> received from the selector 39 for one processing timing, and sends it to the cache memory 3 as the address of the instruction to be fetched next.

On the other hand, the branch monitor unit 35 monitors the execution result of the presently fetched instruction <100> in the instruction buffer 32, and sends the actual instruction branch target address to the comparator 43.

Then, the comparator 43 compares the actual branch target address received from the branch monitor unit 35 with the predicted branch target address <202> received from the delay 41, and outputs the signal indicating whether the addresses coincide or not to the instruction invalidation unit 33, the entry address generation unit 45, and the table registration unit 46.

When the addresses coincide, it implies that the branch prediction has been correct, so that the operation continues to the processing with respect to the next instruction.

On the other hand, when the signal indicating that the addresses do not coincide is received from the comparator 43, it implies that the branch prediction has been incorrect, so that the instruction invalidation unit 33 invalidates the instruction fetched at a next processing timing, which is the instruction <202> erroneously fetched according to the incorrect branch prediction.

Then, the table registration control unit 46 rewrites the entry for the branching address <100> in the branch prediction table 37 by overwriting the incorrect branch target address <202> with the actual branch target address reported from the branch monitor unit 35, where this rewriting operation is carried out with respect to the position in the associative memory indicated by the entry address <01> entered from the entry address generation unit 45.

Here, because the entry address generation unit 45 stores the entry address of the relevant entry in the full associative memory of the branch prediction table 37, the rewriting of the incorrect branch prediction table entry can be carried out immediately. Moreover, because the incorrect branch prediction table entry is directly overwritten with the correct entry, so that the problem of multiple entries for one branching address which could cause the confusion in the branch prediction can be avoided.

In the operation described above, the entry address generation unit 45 operates according to the flow chart of FIG. 5, as follows.

First, at the step 301, whether the comparator 43 has compared the actual branch target address entered from the branch monitor unit 35 with the predicted branch target address entered from the delay 41 or not is determined.

When this comparison has already been done by the comparator 43, it implies that the branch instruction has actually encountered at the predicted branching position, so that next at the step 302, whether the branch target addresses coincide with each other, i.e., whether the branch prediction has been correct or incorrect is determined.

In a case the branch target addresses coincide with each other at the comparator 43, it implies that the branch prediction has been correct, so that the operation of the entry address generation unit 45 terminates.

On the other hand, when the addresses do not coincide with each other, it implies that the branch prediction has been incorrect, so that the rewriting of the corresponding entry in the branch prediction table 37 is necessary. In such a case, next at the step 303, the entry address generation unit 45 sends the entry address corresponding to the entry to be rewritten which is received from the branch prediction table 37 at a time of the branch prediction and stored in the entry address generation unit 45 to the table registration control unit 46, such that the table registration control unit 46 can carry out the appropriate rewriting operation with respect to the appropriate position in the full associative memory of the branch prediction table 37.

When the comparator 43 has not compared the addresses at the step 301, next at the step 304, whether the branch prediction has been made or not is determined.

When the branch prediction has been made, it implies that the branch instruction has not been encountered at the predicted branching address, which indicates that the entry corresponding to the predicted branching address is incorrect and should be deleted. In such a case, next at the step 305, the entry address generation unit 45 stores the corresponding entry address as an open entry address available for the new registration of new entry, in which case the table registration control unit 46 delete the corresponding entry in the branch prediction table 37.

When the branch prediction has not been made, it implies that the branch instruction has been encountered at the address which is not registered as the branching address in the branch prediction table 37 which indicates that there is no entry corresponding to the encountered branch instruction and a new entry should be created. such a case, next at the step 306, the entry address generation unit 46 sends an open entry address stored in the entry address generation unit 45 or a new entry address newly generated by using a random number for example to the table registration control unit 46, such that the table registration control unit 46 can carry out the appropriate new registration operation with respect to the available position in the full associative memory of the branch prediction table 37.

Figures 5, 6:
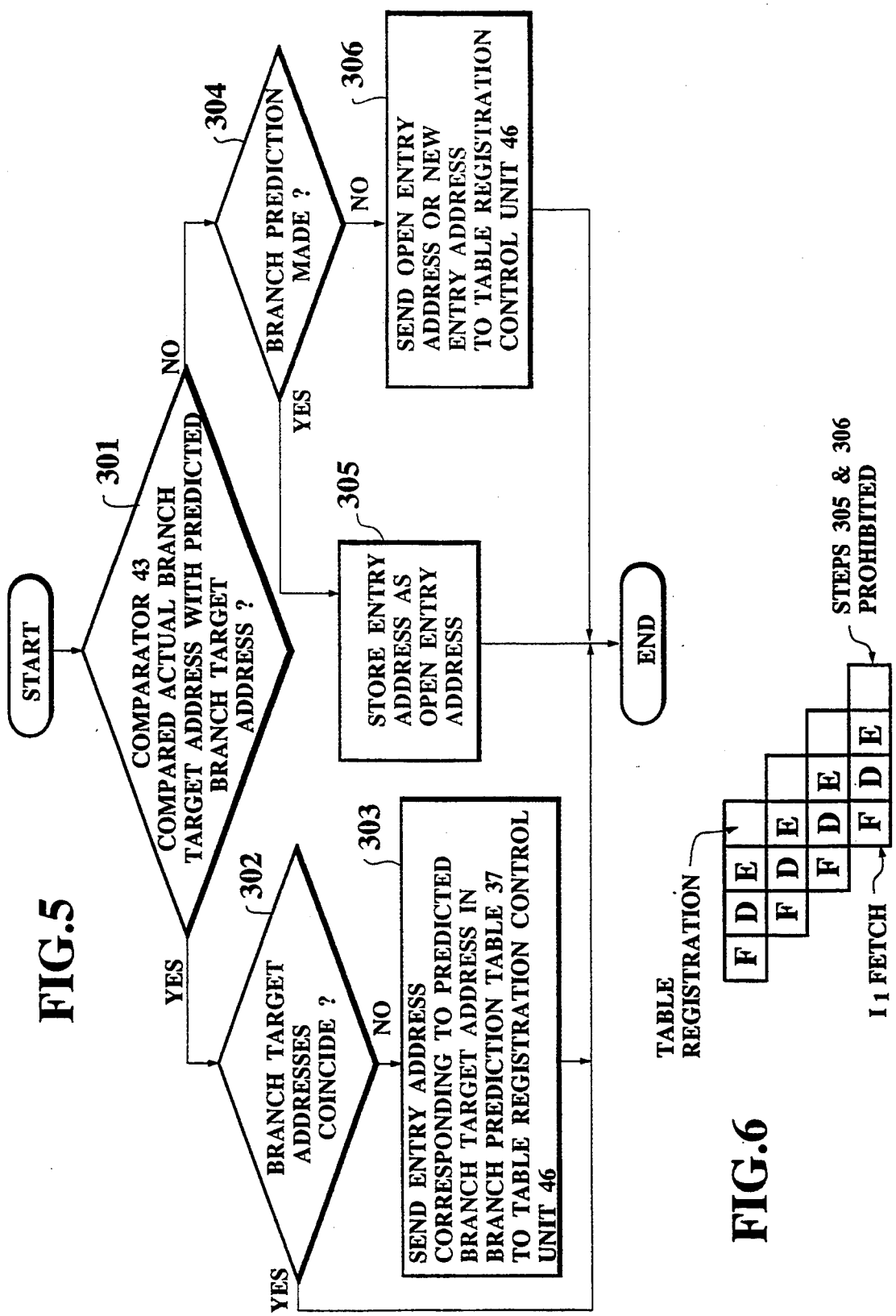
FIG. 5 is a flow chart for an operation of an entry address generation unit in the branch prediction apparatus of FIG. 4.
FIG. 6 is a diagram of process flow in the apparatus of FIG. 4 for explaining its operation.

It is noted that, as shown in FIG. 6, when the instruction $I_1$ monitored by the branch monitor unit 35 was fetched at the same processing timing as the rewriting or new registration of the branch prediction table 37 is carried out by the table registration control unit 46, the steps 305 and 306 described above should be bypassed in order to avoid the possibility for the correctly rewritten entry to be erroneously taken as an open entry at the step 305, or for the correct newly registered entry to doubly registered at the step 306.

Thus, according to this second embodiment, it becomes possible to realize the branch prediction using a branch prediction table formed by a full associative memory without causing confusion in the branch prediction, such that the branch prediction can be carried out more effectively at higher speed.

Figure 7:
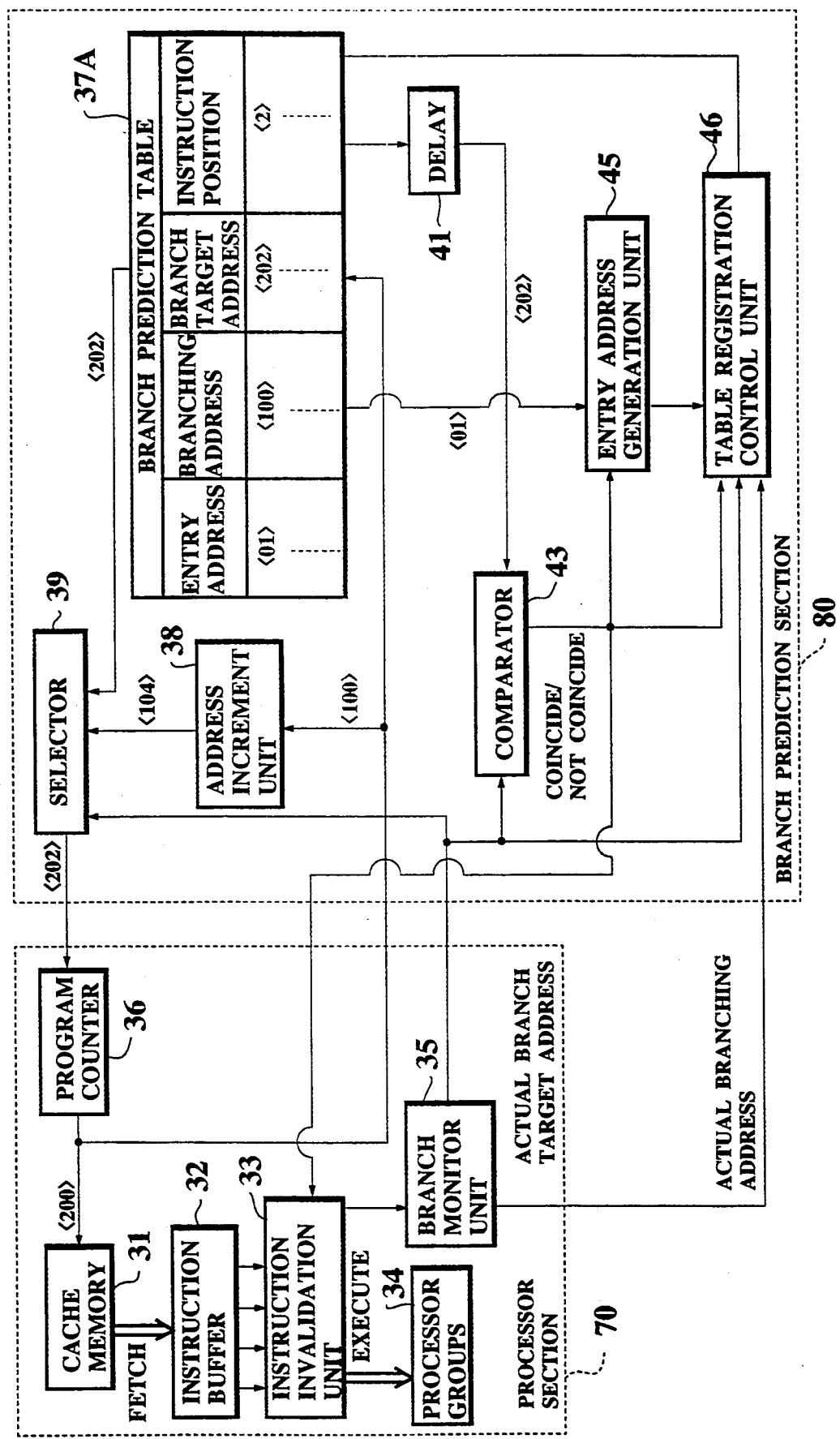
FIG. 7 is a block diagram of the third embodiment of an apparatus for branch prediction according to the present invention.

Referring now to FIG. 7, the third embodiment of an apparatus for branch prediction according to the present invention will be described in detail. This third embodiment is a modification of the second embodiment described above such that it is suitable for a super scalar type processor which is capable of concurrent execution of multiple instructions. In FIG. 7, those elements which are substantially equivalent to the corresponding elements described above for the second embodiment in conjunction with FIG. 6 will be given the same reference numerals, and their description will be omitted.

In this third embodiment, the branch prediction table 37A differs from the branch prediction table 37 of FIG. 6 in that each entry in the branch prediction table 37A also contains the instruction position for indicating a position of the branch instruction in the group of the instructions identified by the branching address, just as in the branch prediction table 7 of the first embodiment described above.

Thus, by using this instruction position, it becomes possible to deal with a super scalar type processor which is capable of concurrent execution of multiple instructions, just as in the first embodiment described above.

In this case, the instruction buffer 32 fetches a plurality of instructions concurrently, and the address increment unit 38 updates the address in unit of a number of instructions to be fetched concurrently such as four.

It is to be noted that, in this third embodiment, when the entry address generation unit 45 carries out the operation similar to that described above for the second embodiment in conjunction with FIG. 5, it is necessary at the step 306 to first check if the registered instruction position corresponding to the registered branching address is ahead of that of an address from which the address of the fetched instructions is produced at the program counter 6, or if there is a registered branching address to which the branch target address corresponding to the branching address of interest belongs, and for which the corresponding instruction position is ahead of that of the branch target address corresponding to the branching address of interest, just as in the step 104 of FIG. 2 in the first embodiment described above. When the registered instruction position is found to be ahead, or when such a registered branching address is found, the branch prediction should not be carried out, just as in the first embodiment described above.

Thus, according to this third embodiment, it becomes possible to realize the branch prediction using a branch prediction table formed by a full associative memory which is also suitable for a processor of super scalar type without causing confusion in the branch prediction, such that the branch prediction can be carried out more effectively at higher speed.

Figure 8:
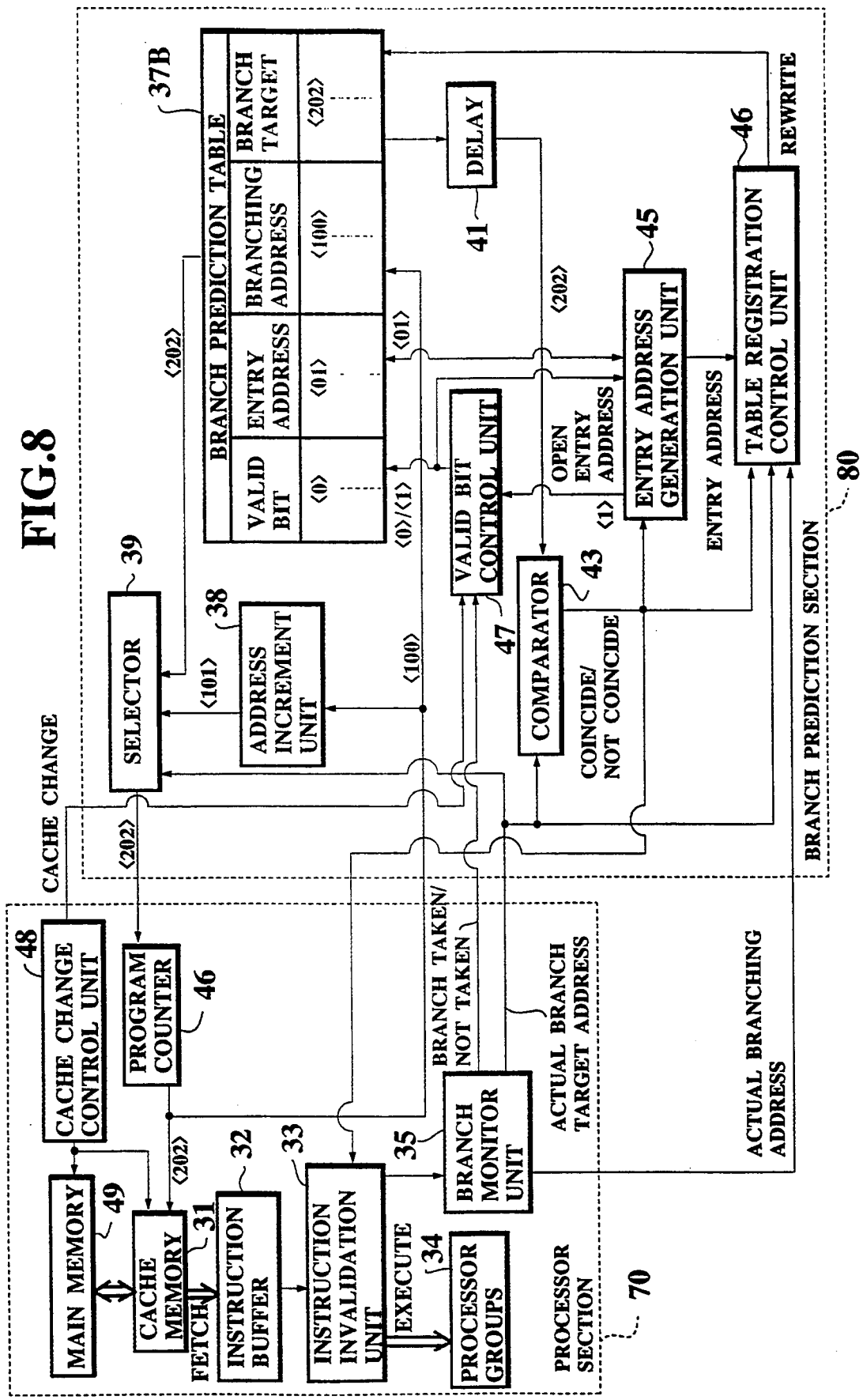
FIG. 8 is a block diagram of the fourth embodiment of an apparatus for branch prediction according to the present invention.
Figure 9:
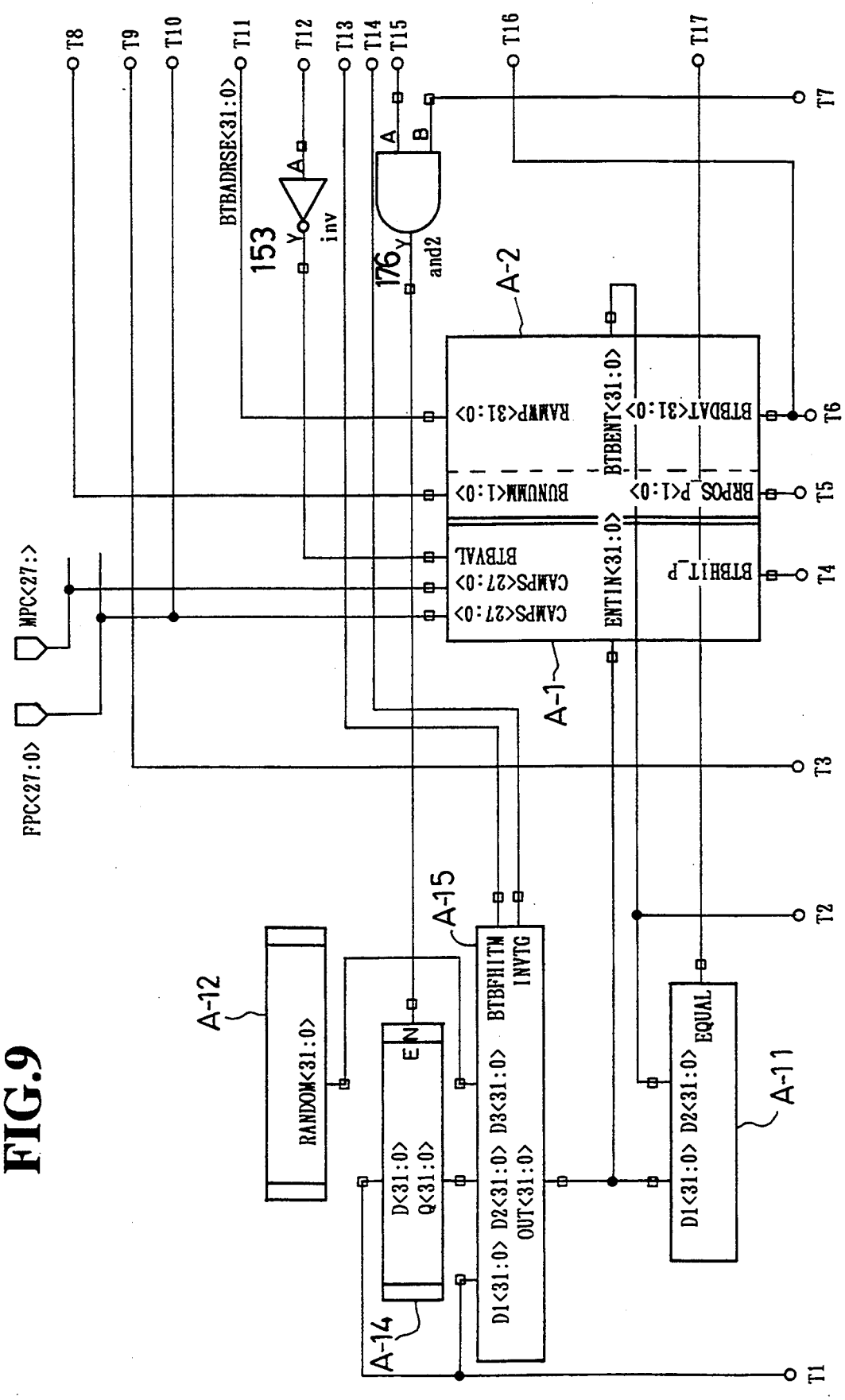
FIG. 9 to FIG. 14 are a set of circuit diagrams showing a practical implementation of the branch prediction apparatus according the present invention.
Figure 10:
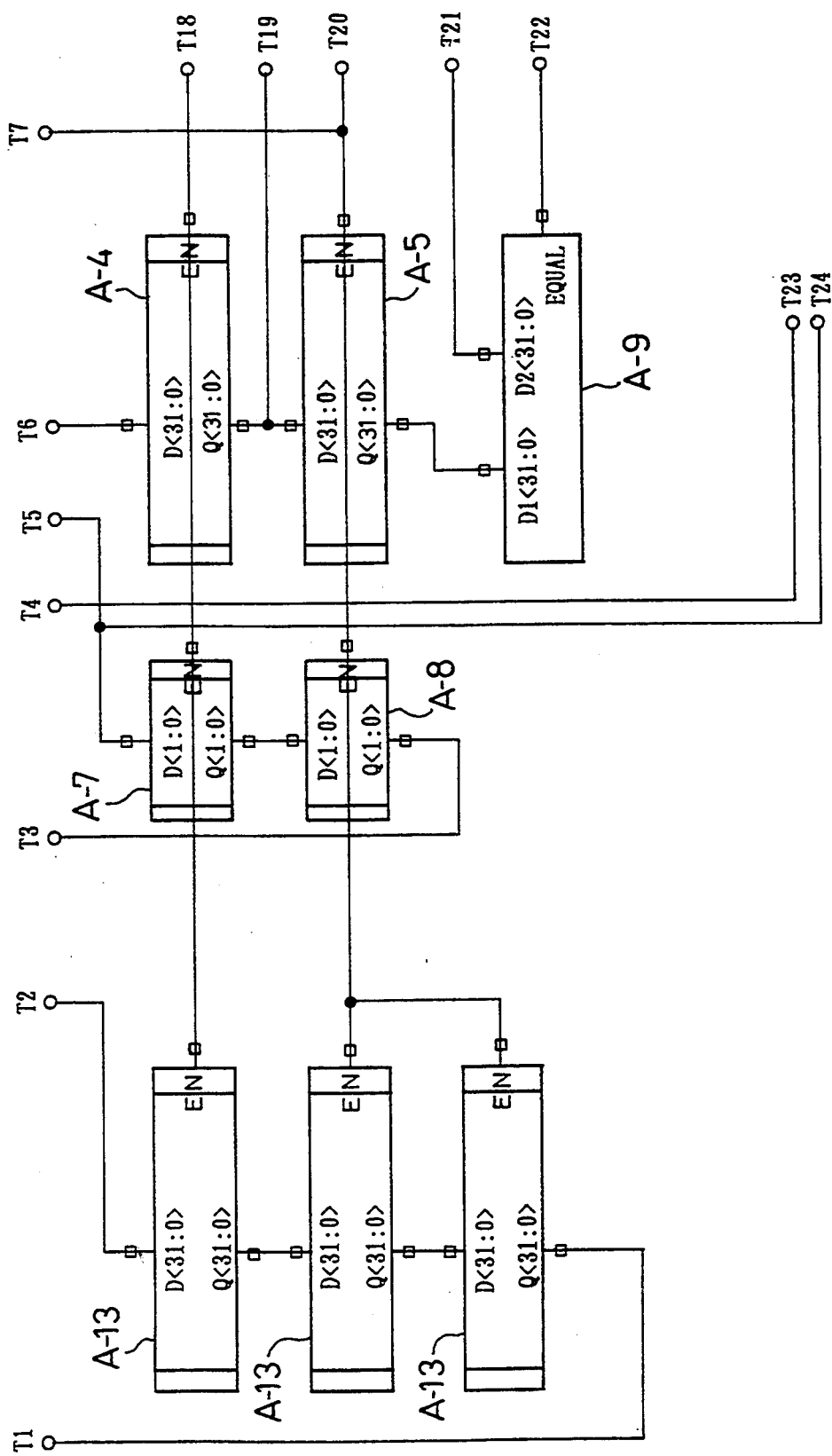
Figure 11:
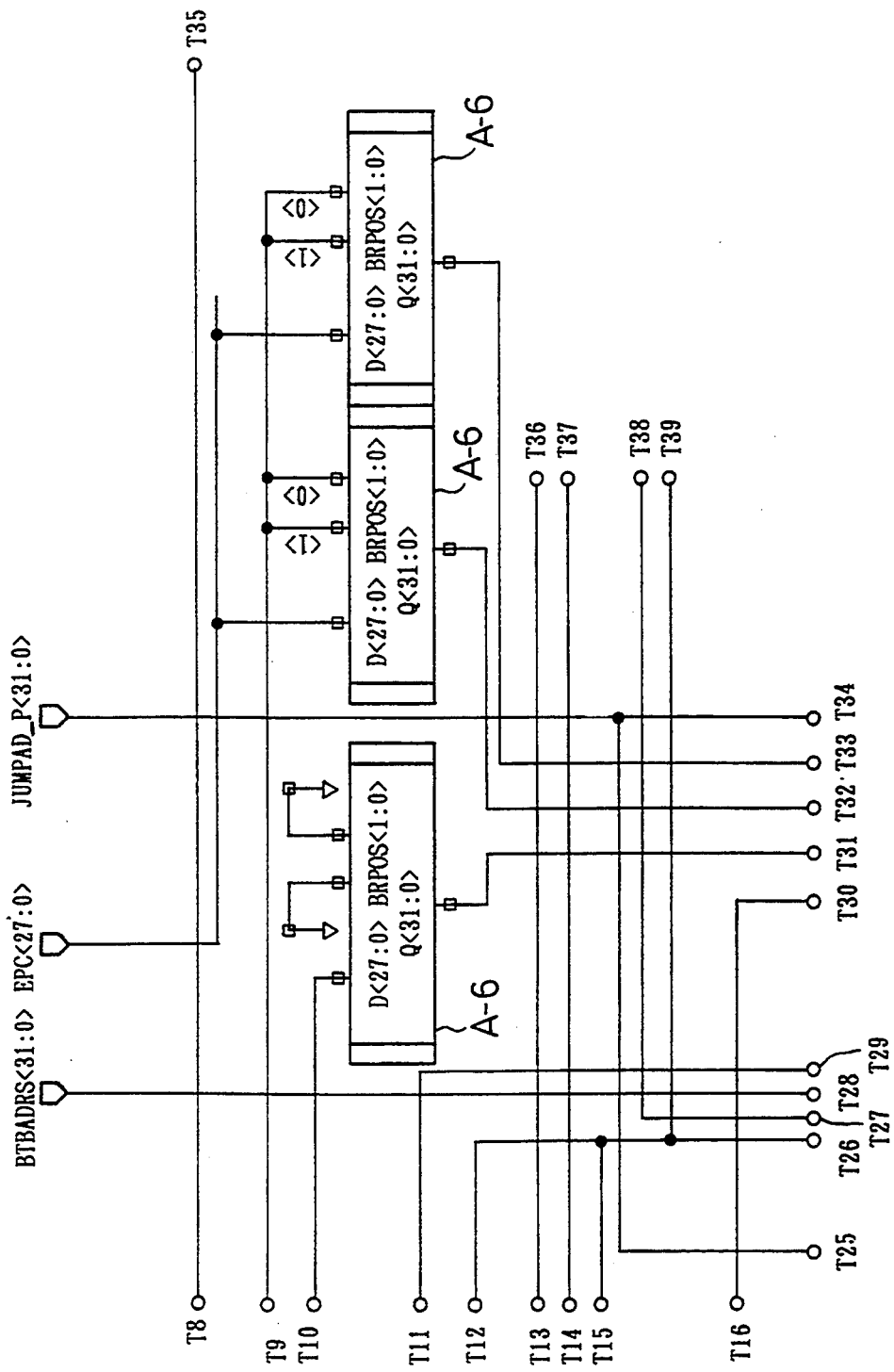
Figure 12:
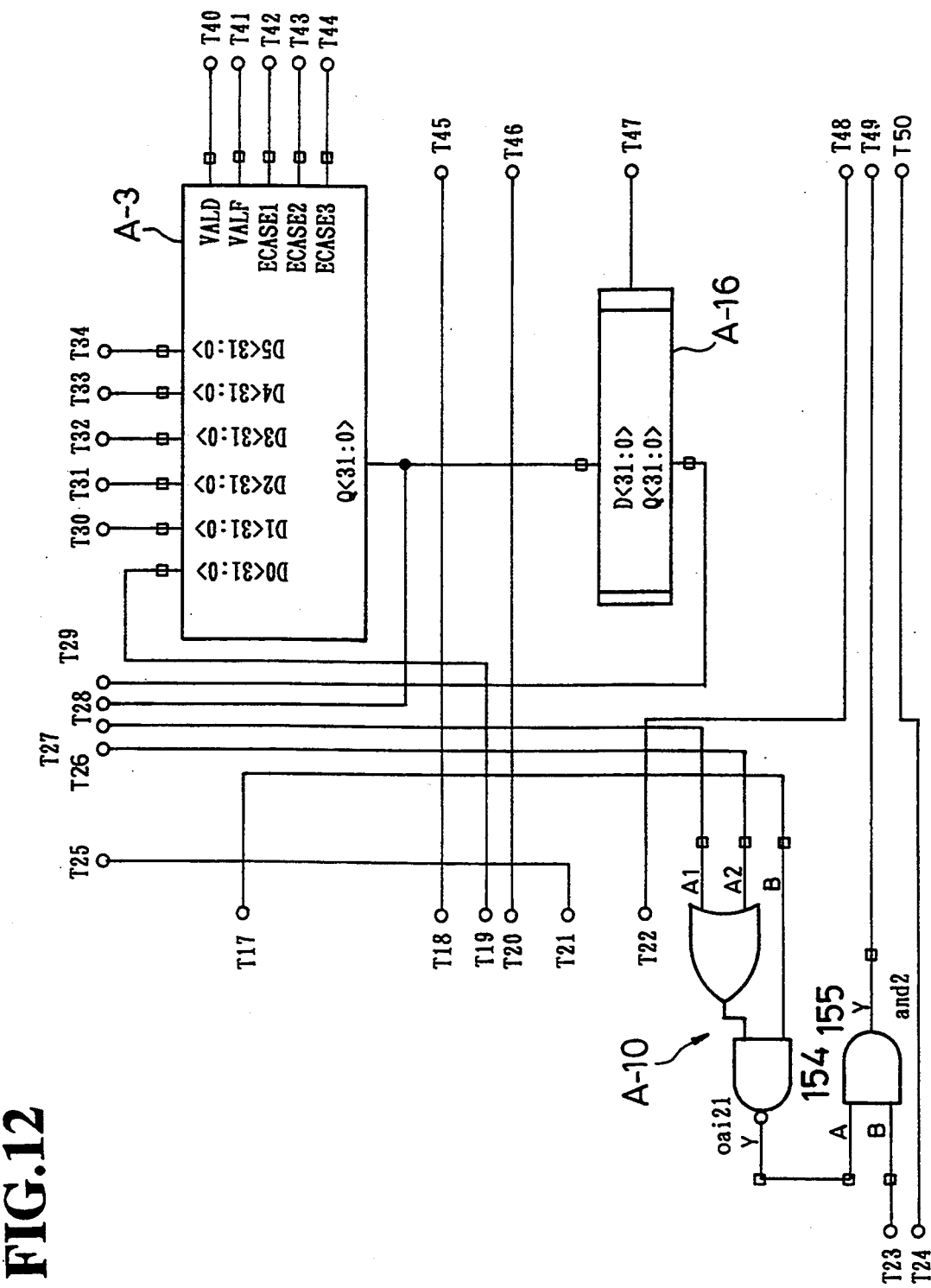
Figure 13:
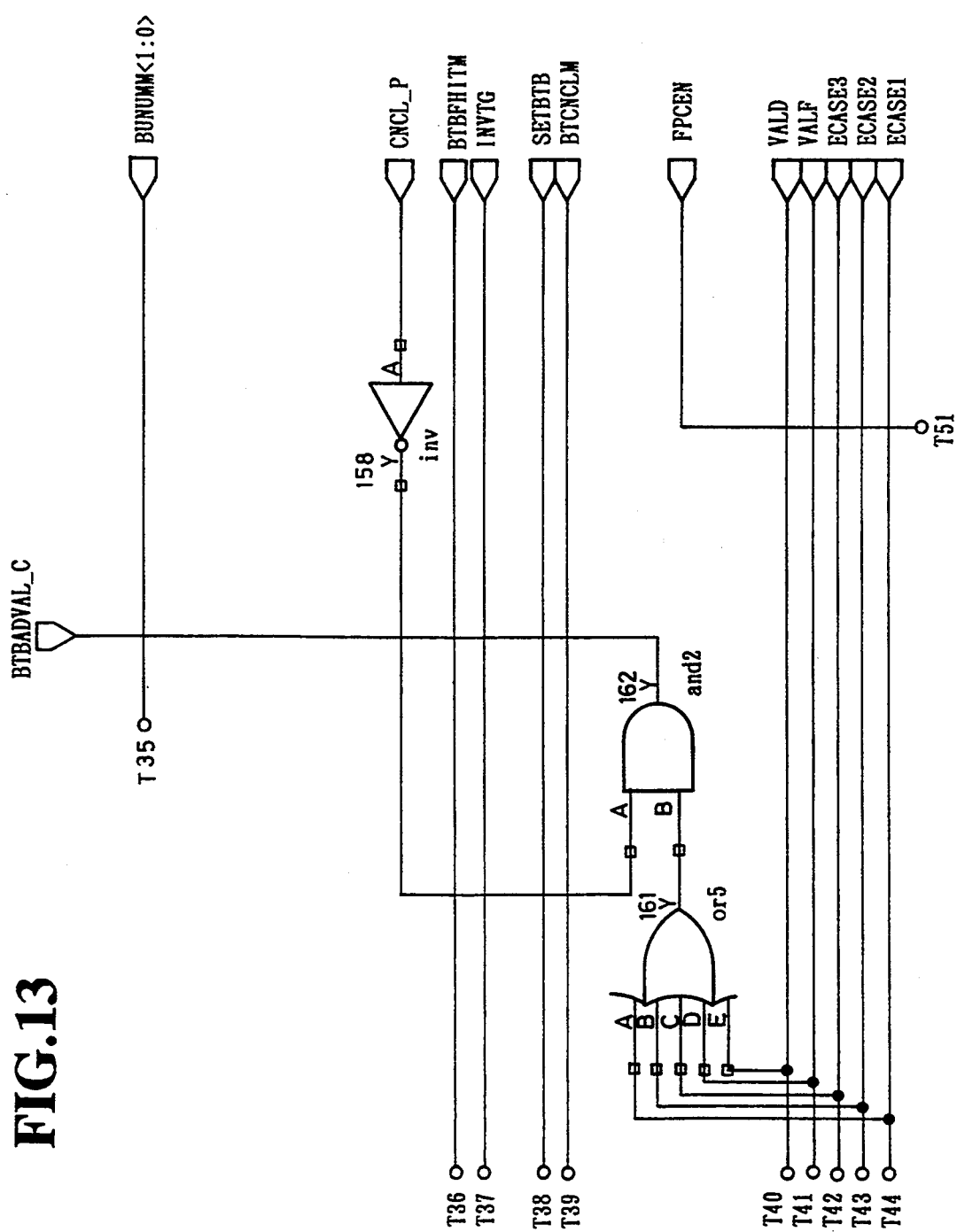

Referring now to FIG. 8, the fourth embodiment of an apparatus for branch prediction according to the present invention will be described in detail. This fourth embodiment is a modification of the second embodiment described above in which the management of the open entries in the branch prediction table is improved. In FIG. 8, those elements which are substantially equivalent to the corresponding elements described above for the second embodiment in conjunction with FIG. 6 will be given the same reference numerals, and their description will be omitted.

In this fourth embodiment, the branch prediction table 37B differs from the branch prediction table 37 of FIG. 6 in that each entry in the branch prediction table 37B also contains a valid bit indicating whether the entry is an open or not. For example, the valid bit <0> indicates not open, and the valid bit <1> indicates open.

In addition, there is provided a valid bit control unit 47 for changing the valid bit in the branch prediction table 37B.

Here, the branch monitor unit 35 reports whether the predicted branch has actually been taken or not to the valid bit control unit 47, and when the predicted branch has actually not taken, the valid bit control unit 47 changes the valid bit of the entry for the predicted branching address from <0> to <1> to indicate the entry for the branch which has actually not taken as an open.

Also, in this fourth embodiment, the processor section 70 may include a cache change control unit 48 for controlling the cache memory 31 and a main memory 49 to change the cached content in the cache memory 31 to other content stored in the main memory 49. In such a case, the cache change control unit 48 reports the cache change to the valid bit control unit 47 such that the valid bit control unit 47 changes the valid bit of the entries for the branching addresses which have been removed from the cache memory 31 by the cache change from <0> to <1> to indicate that these entries are open.

Also, in this fourth embodiment, when the entry address generation unit 45 carries out the operation similar to that described above for the second embodiment in conjunction with FIG. 5, the entry address generation unit 45 may send the entry address of the entry with the valid bit <0> to the table registration control unit 46 at the step 306 before generating any new entry address, such that the entry addresses of the full associative memory of the branch prediction table 37B can be utilized more efficiently and the registration of the new entry can be carried out more quickly.

Thus, according to this fourth embodiment, it also becomes possible to realize the branch prediction using a branch prediction table formed by a full associative memory without causing confusion in the branch prediction, such that the branch prediction can be carried out more effectively at higher speed.

Figure 14:
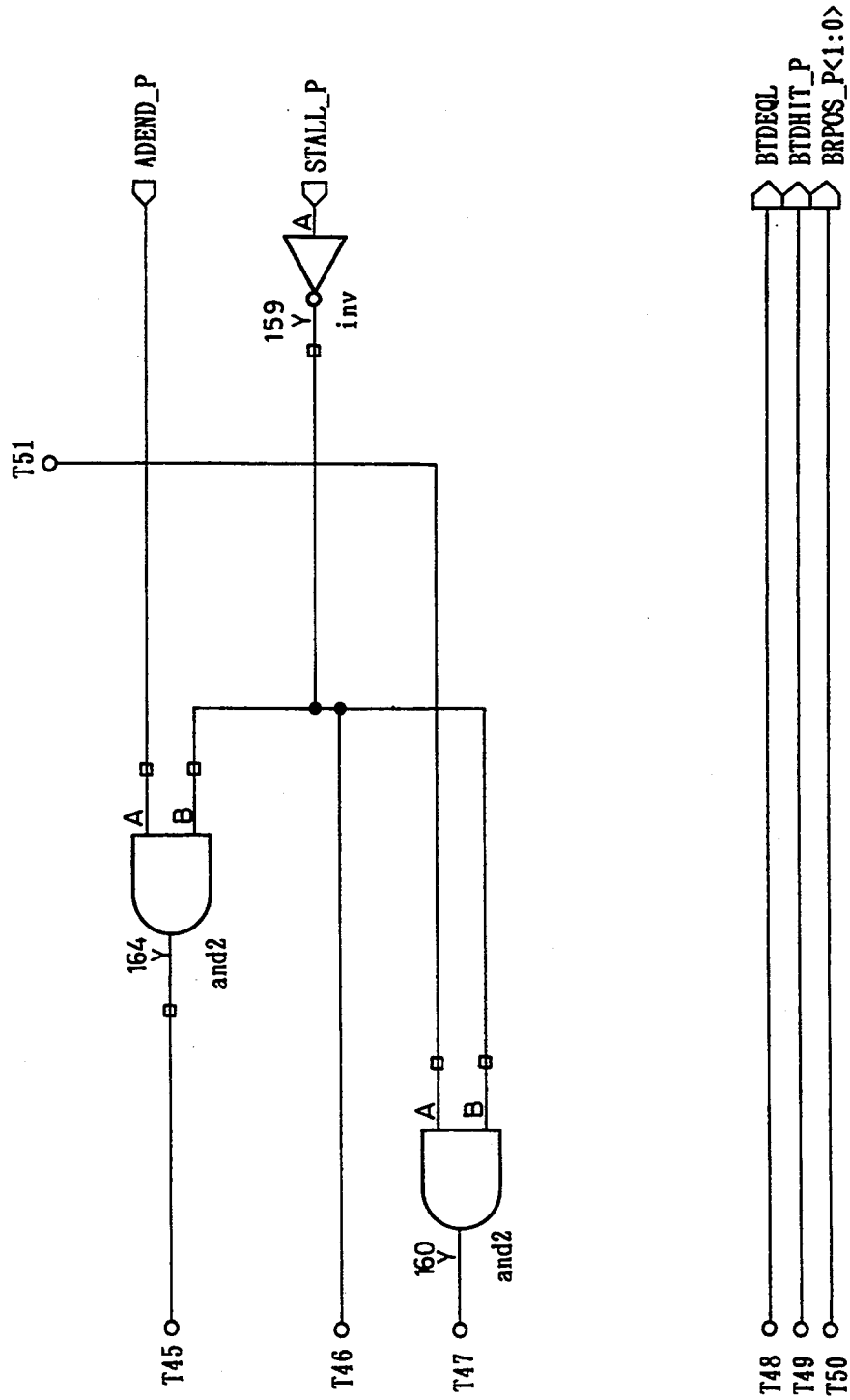
Figure 15:
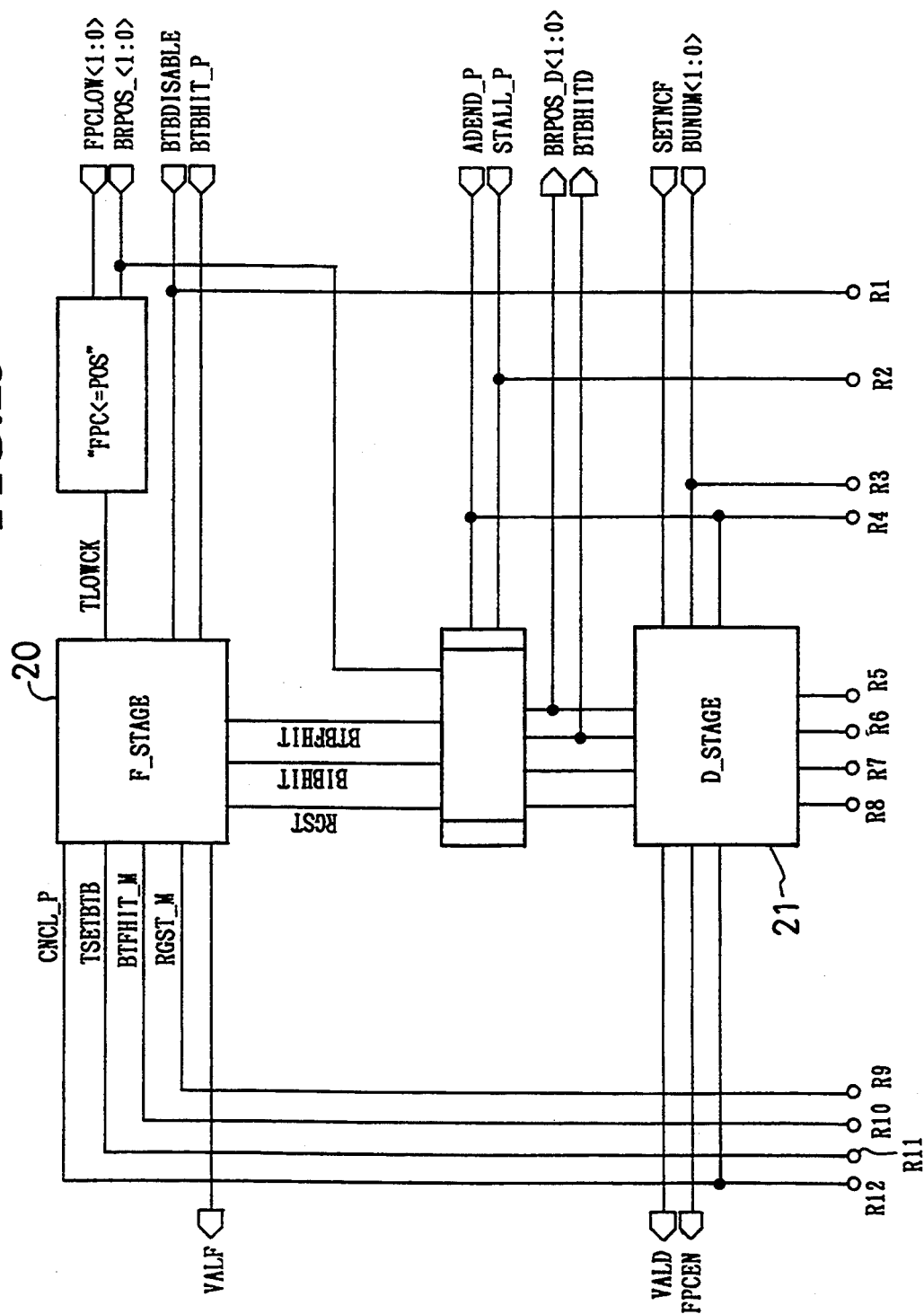
FIG. 15 to FIG. 17 are a set of circuit diagrams showing a control device to be associated with the branch prediction apparatus shown in FIG. 9 to FIG. 14.
Figure 16:
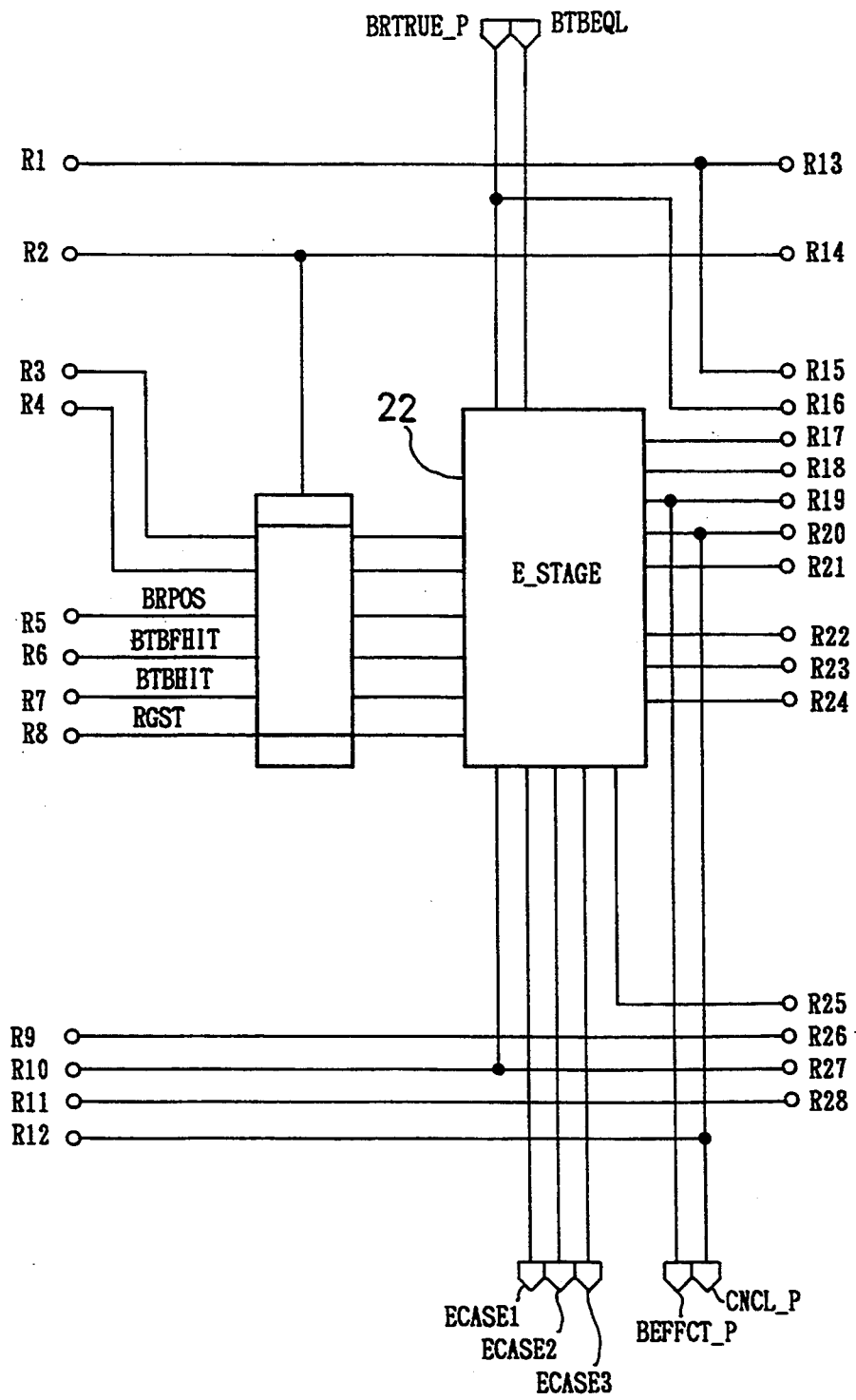
Figure 17:
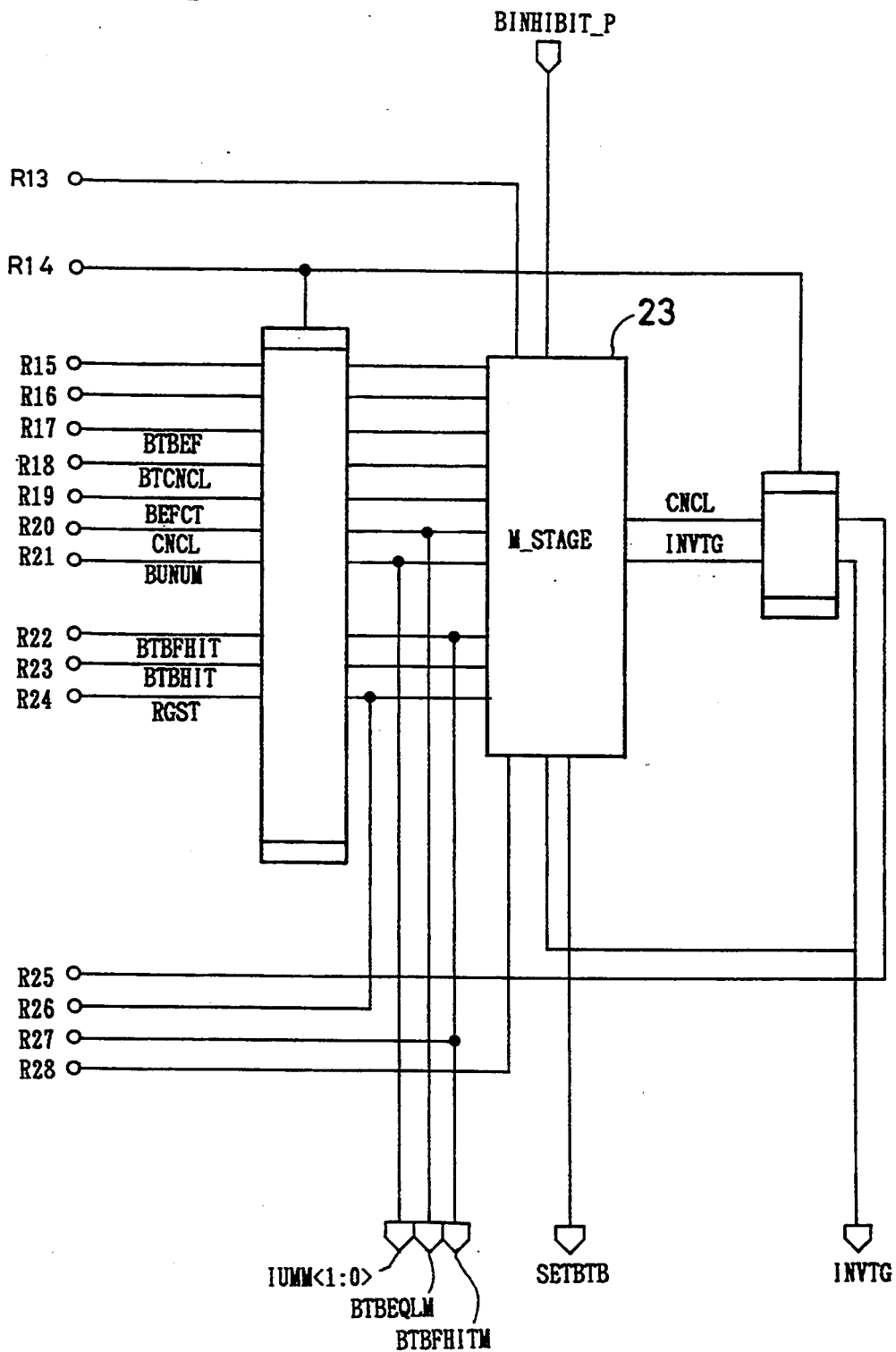
Figure 18:
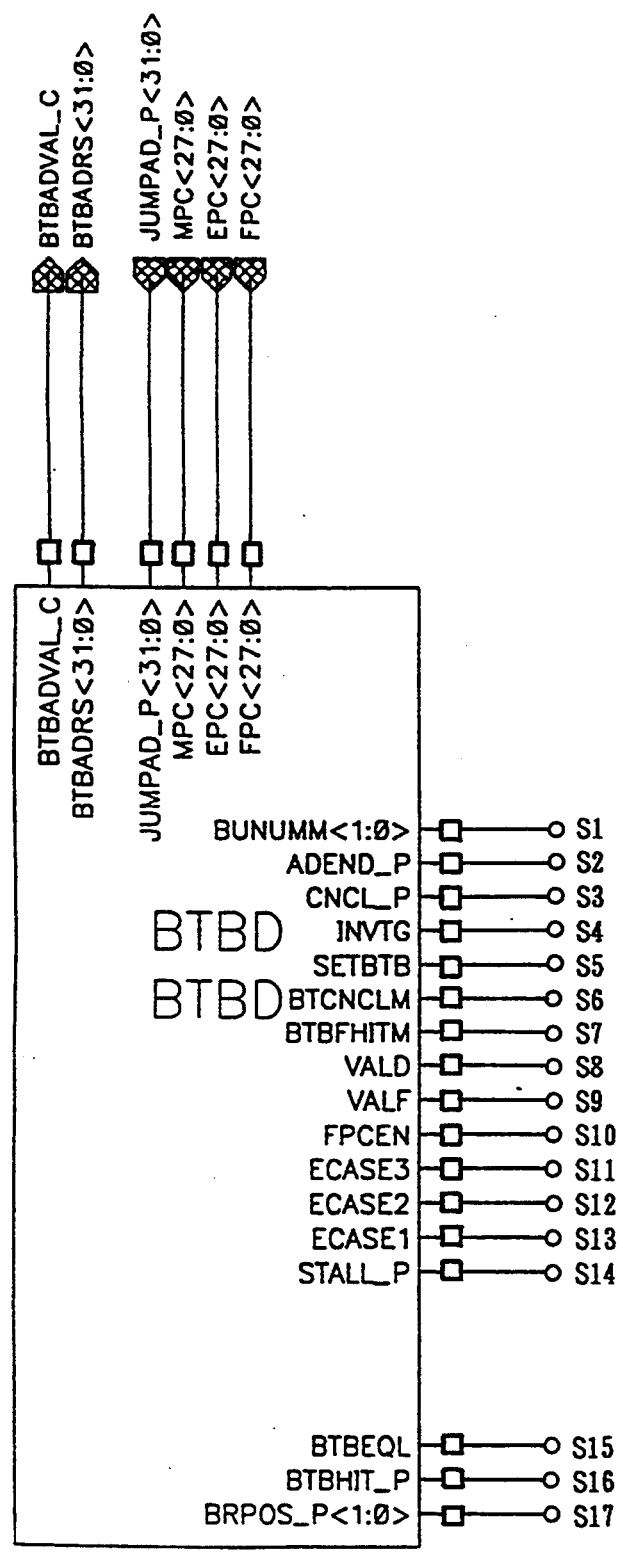
FIG. 18 and FIG. 19 are a set of circuit diagrams showing a connection of the branch prediction apparatus shown in FIG. 9 to FIG. 14 and the control device shown in FIG. 15 to FIG. 17.
Figure 19:
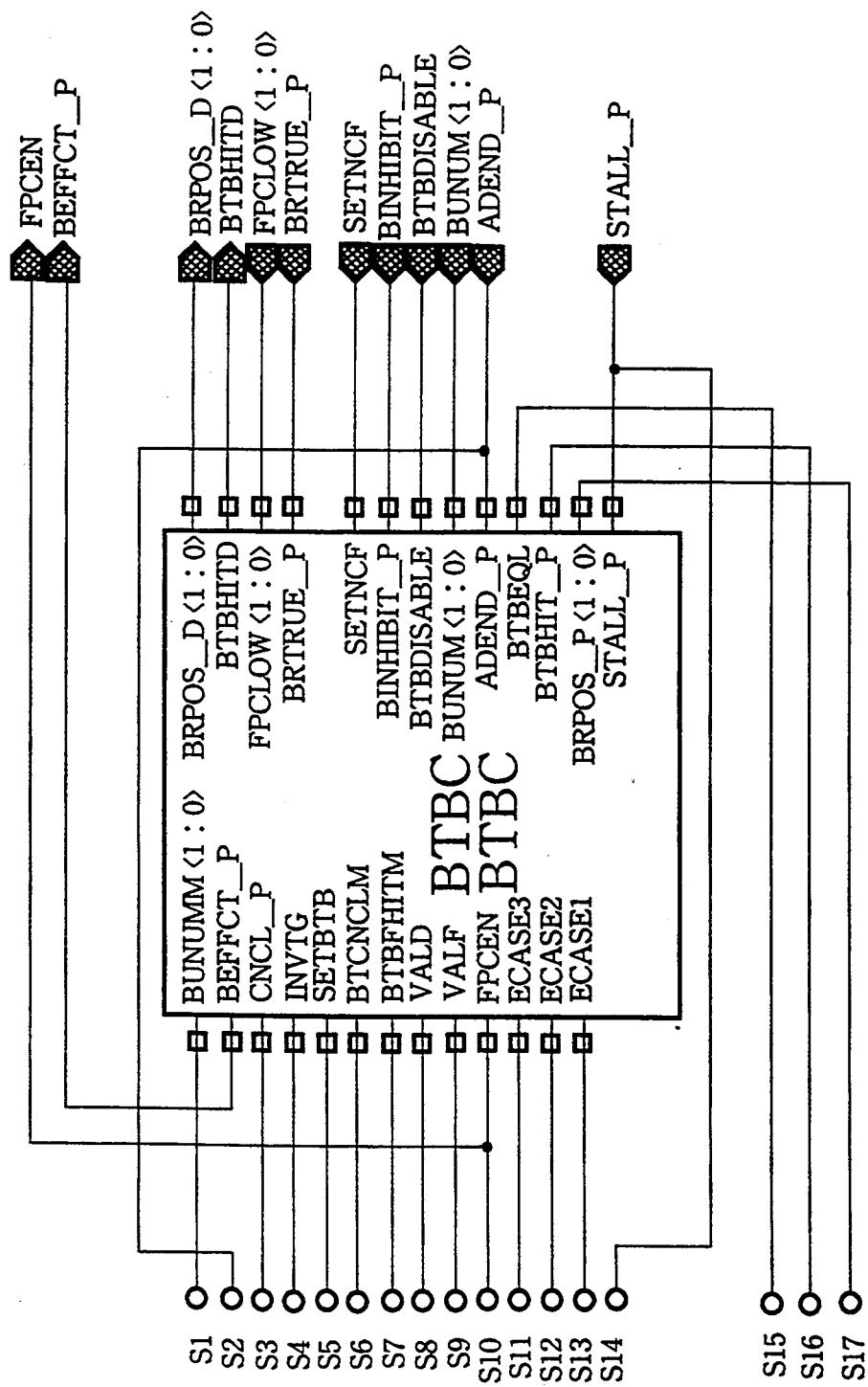

Referring now to FIG. 9 to 19, a specific circuit implementation of the apparatus according to the present invention incorporating all the features of the above described embodiments will be described in detail. In the figures, FIG. 9 to FIG. 14 collectively show a circuit implementation of the branch prediction apparatus, which is referred to as a BTB circuit, where it is to be understood that the terminal number Tn (n=1, 2, ...) appearing on each figure is connected to the identical terminal number appearing on the other figure. Also, FIG. 15 to FIG. 17 collectively show a control circuit to be connected to the BTB circuit of FIG. 9 to FIG. 14, where it is to be understood that the terminal number Rn (n)=1, 2, ...) appearing on each figure is connnected to the identical terminal number appearing on the other figure. Also, FIG. 18 and FIG. 19 collectively show a configuration in which the BTB circuit of FIG. 9 to FIG. 14 and the control circuit of FIG. 15 to FIG. 17 are connected, where it is to be understood that the terminal number Sn (n=1, 2, ...) appearing on each figure is connected to the identical terminal number appearing on the other figure.

First, the control circuit of FIG. 15 to FIG. 17 will be described in detail. This control circuit of FIG. 15 to FIG. 17 involves four stages comprising F stage 20 (Fetch), D stage 21 (Decode), E stage 22 (Execution), and M stage 23 (Memory access). The operations to be carried out at these stages are as follows.

F stage

BTBHIT_P signal is received from the data path unit, and according to the context of the stages and the state of the branch unit, whether the received BTBHIT_P signal is really effective or not is checked. When the received BTBHIT_P signal is found to be really effective, VALF signal to make the address of the BTB effective is returned.

The BTBHit judges the Hit by using the slot in unit of four instructions, and generates a state called a tentative hit in a case the FPC arrives after the branch instruction by comparing the least significant bit of the FPC with the position in the four instructions at which the branch instruction was located in the past. This operation is included in order to prevent the creation of the doubly registered entry in the associative memory.

D stage

The position in the four instructions at which the branch instruction was located in the past is checked, and when this position is the last one in the four instructions, it is treated as the delayed-slot, and then VALD signal is generated.

E stage

The branch instruction is actually executed at the BU (Branch Unit), and the address generated at a time of BTBHit in the F stage is compared with the address generated by the actual execution of the branch instruction at the BU, so as to confirm the address predicted by the BTB.

Then, confirmation signal ECASE1-3 and CNCL_P signal for cancelling the operation of the BTB are generated.

M stage

The registration operation classified into the following three cases is carried out.

(1) In a case in which there is no effective Hit in the F stage and the appearance of the branch is detected in the E stage, the new registration signal SETBTB is issued to the BTB. At a time of registration, it issues an indication for using one of a random entry address, an entry for which the Hit has been obtained (BTBFHITM), and a previously cancelled address (INVTG).

(2) In a case in which the effective Hit has been generated in the F stage, but it jumped to the different address at a time of the confirmation in the E stage (a case of indirect register branch), the new target address is registered for the entry for which the Hit has been obtained.

(3) In a case the BTBHit is obtained in the F stage, but the appearance of the branch is not detected in the E stage, the cancellation of the BTB is carried out (BTBCLM).

Now, the BTB circuit of FIG.. 9 to FIG. 14 will be described in detail. In this BTB circuit, A-1 is the address storage formed by an associative memory (CAM). Here, a number of entries for storing the addresses is taken to be 32.

As the inputs of A-1, CAM-Search-Port (CAMSP) and CAM-Write-Port (CAMWP) in 27 bits are provided so that the search operation and the registration operation of the CAM can be carried out simultaneously. At a time of the registration operation, the entry address for specifying the entry to be written is specified by ENTIN<31:0>. Also, there is an entry effective flag BTBVAL in 1 bit for indicating the effectiveness of the entry, such that the Hit signal is not produced when this valid bit is 0 even when the CAMSP and the interior TAG are matched in the CAM. Also, when the CAMSP and the interior TAG are matched in the search operation and the valid bit is 1, the data in the RAM section for that entry are read out.

A-2 indicate the above described RAM section. This RAM section is divided into the BRPOS section for indicating the position of the branch instruction in the four instructions which has a field of 2 bits, and the DATA section for indicating the branch target which has a field of 32 bit.

As the inputs of this RAM section, BUNUM-M<1:0> and RAM-Write-Port(RAMWP)<31:0> are provided in correspondence to the above described fields, and they are registered in the same entry at the same time as the registration operation of the CAM section. When the Hit is generated by the sear operation, the DATA in the RAM section for the entry for which the Hit has been obtained are read out. These writing in the registration operation and reading in the search operation can be carried out simultaneously in the RAM section. Also, the entry for which the Hit has been obtained in the CAM section is outputted to BTBENT<31:0>.

The DATA section output BTBDAT<31:0> for indicating the branch target of the associative memory A-2 is connected to the D1 input of the branch target selector A-3. The same output is also connected to the pipe line register A-4. The output of the pipe line register A-4 is further connected to the pipe line register A-5 and the D0 input of the branch target selector A-3. Although it depends on the pipe line stage of the processor to be used, the hit search in the BTB is carried out at the F stage, and A-4 corresponds to the pipe line stage of the D stage, while A-5 corresponds to the pipe line stage of the E stage.

The branch target selector A-3 switches its six inputs by using signal lines VALD, VALF, ECASE1, ECASE2, and ECASE3. The DATA of D0 to D4 are selected sequentially, and when they are all 0 the DATA of D5 are outputted to the output Q<31:0>. The signal line VALF is a control line for indicating that the output of the associative memory is effective at the F stage, which is the signal produced at the control section shown in FIG. 13 and FIG. 14. VALD is a signal for taking care of the delay slot, where this signal becomes 1 when the delay slot is desired to be made effective. ECASE1, ECASE2, and ECASE3 are the adjustment addresses for a case in which it is revealed that the incorrect address had been outputted at the F stage when the confirmation of the branch target of the BTB is carried out at the E stage. ECASE1 is provided because when the prediction of the BTB is correct the branch unit outputs the address of the branch target but the branch has actually already been taken, so that there is a need for providing the increment to the FPC. ECASE2 is a signal for taking care of the case in which the branch position in the four instructions is displaced. ECASE3 is a signal for setting FPC to the delay slot in a case the prediction of the BTB is incorrect.

The address calculation means A-6 is for carrying out the address calculation in accordance with the assertion of one of ECASE1, ECASE2, and ECASE3 signals as described above. This address calculation is carried out according to FPC, EPC, and BRPOS_E<1:0> which is a signal which sends BRPOS indicating the position at which the branch instruction is located in the four instructions at a time of the BTB registration to the E stage by the pipe line registers A-7 and A-8 similar to A-4 and A-5.

The output Q<31:0> of the branch target selector A-3 is transmitted to the branch unit as BTBADRS<31:0>, while the BTBADVAL_C obtained as a logical sum of the BTB operation invalidation signal CNCL_P and the OR of the above described signal lines VALD, VALF, ECASE1, ECASE2, and ECASE3 is also transmitted to the branch unit as the effective signal for the BTBADRS.

A-9 is a coincidence detection circuit in 32 bits which is a circuit got carrying out the confirmation of the address JUMPAD_P<31:0> of the branch target entered from the branch unit and the branch target of the BTB. The coincidence signal is transmitted to the control section as BTBEQL.

The entry address at a time of the registration is selected from the three candidates of the random register A-12, the DATA which is the entry at which the Hit has been obtained which is sent by the pipe line register A-13 to the M stage to carry out the registration, and A-14 which memorizes the entry for which the cancellation has been made previously. The selection is carried out at the selector A-15 by the signals BTFHITM and INVTG entered from the BTB control unit.

BTFHITM is a signal which is asserted when it is revealed that the address for which the Hit has been obtained by the BTB had been excluded at the E stage, and it is a control line for taking care of a case in which the double entry occurs if the registration is not carried out to the entry for which the Hit has been obtained by the BTB. INVTG is a signal which is asserted when the cancellation had occurred, and it is continued to be asserted until. the next registration is carried out.

The selector A-15 selects the DATA which is the entry for which the Hit has been obtained which is sent by the pipe line register A-13 to the M stage to carry out the registration of the entry for which the Hit has been obtained in a case BTFHITM is asserted, and the entry address of A-14 which memorizes the entry for which the cancellation had been made previously in a case BTFHITM is 0 and INVTG is asserted, while otherwise it selects the value of the random register A-12.

The associative memories A-1 and A-2 have the circuit configuration in which the search operation and the registration operation can be carried out simultaneously, but there is a case in which the reliability of the data becomes a problem when the search and the registration occurred with respect to the same entry simultaneously. The present configuration has a function to detect the occurrence of the search and the registration with respect to the same entry in order to take care of such a case.

The coincidence circuit of A-11 and the logical circuit of A-10 detect the occurrence of the search and the registration with respect to the same entry, and mask the Hit signal of the associative memories A-1 and A-2.

In the pipe line register, the writing becomes effective when there is no STALL_P signal for temporarily froze the pipe line. However, for the first pipe line register of the pipe line registers A-14, A-7, and A-13 existing between the F stage and the D stage, there is an additional condition of ADEND_P signal indicating whether all of the four instructions has been executed or not. The output of the branch target selector A-3 is latched by the register A-16, and is connected to the RAM section input port RAMWP of the associative memory A-2.

It is to be noted that the embodiments described above may be modified such that the instruction of the branch target is also stored in the branch prediction table.

On the other hand, the embodiments described above may be modified to form the cache memory and the branch prediction table integrally in a single memory device such that the branch target address is also stored in the cache memory and can be specified at a time of fetching from the cache memory.

Also, the branch prediction entries to be registered may be determined according to the frequency of the occurrence of the branch rather than registering all the branches that occurred previously as in the embodiments described above.

Moreover, it is not absolutely necessary for the branch prediction table to be equipped with means for deleting the registered entry.

Furthermore, when there is a possibility for the mistake at a time of the instruction fetch, instead of stopping the registration, the mistake may be ascertained by the comparison with the entry immediately after the registration.

Besides those already mentioned above, many modifications and variations of the above embodiments may be made without departing from the novel and advantageous features of the present invention. Accordingly, all such modifications and variations are intended to be included within the scope of the appended claims.

What is claimed is:

1. An apparatus for branch prediction, comprising:
    processor means for executing a plurality of instructions concurrently;
    a branch prediction table which registers entries, each entry including a branching address indicating the plurality of instructions containing a predicted branch instruction, a branch target address of said predicted branch instruction, and an instruction location indicating a location of said predicted branch instruction in said plurality of instructions indicated by said branching address;
    instruction fetch means for fetching the plurality of instructions to be executed concurrently by said processor means by fetching the plurality of instructions indicated by the branch target address of the predicted branch instruction for a presently fetched plurality of instructions at a next processing timing, where said predicted branch instruction for said presently fetched plurality of instructions is registered in one entry of said branch prediction table having the branching address which coincides with an address of said presently fetched plurality of instructions;
    prediction judging means for judging said predicted branch instruction for said presently fetched plurality of instructions as correct when said predicted branch instruction is actually encountered during actual execution of said presently fetched plurality of instructions; and
    predicted instruction invalidation means for invalidating the plurality of instructions indicated by said branch target address of said predicted branch instruction for said presently fetched plurality of instructions which are fetched by said instruction fetch means at the next processing timing, when said prediction judging means does not judge said predicted branch instruction as correct.

2. The apparatus of claim 1, wherein said prediction judging means includes a comparator for comparing the instruction location registered in the entry of said branch prediction table having the branching address which coincides with the address of said presently fetched plurality of instructions with an actual instruction location of an actual branch instruction encountered during actual execution of said presently fetched plurality of instructions.

3. The apparatus of claim 2, further comprising table registration means for rewriting the entries in said branch prediction table, wherein when said actual instruction location of said actual branch instruction encountered during said actual execution of said presently fetched plurality of instructions is different from the instruction location of said predicted branch instruction for said presently fetched plurality of instructions and said actual branch instruction is not actually taken, said table registration means does not rewrite said entries in said branch prediction table until execution of all of said presently fetched plurality of instructions is finished, unless another branch instruction is encountered during actual execution of said presently fetched plurality of instructions after said actual branch instructions.

4. The apparatus of claim 2, further comprising table registration means for rewriting entries in said branch prediction table and registering as a new entry the actual branch instruction for said presently fetched plurality of instructions in said branch prediction table when an actual branch prediction encountered during actual execution of said presently fetched plurality of instructions is not registered in said branch prediction table.

5. The apparatus of claim 1, further comprising present instruction invalidation means for invalidating instructions in said presently fetched plurality of instructions which are located after said instruction location of said predicted branch instruction for said presently fetched plurality of instructions before said actual execution of said presently fetched plurality of instructions.

6. The apparatus of claim 5, wherein said instruction fetch means fetches instructions invalidated by said present instruction invalidation means at the next processing timing in a case when all branch instructions encountered during said actual execution of said presently fetched plurality of instructions are not actually taken and in a case when no branch instruction is encountered during execution of said presently fetched plurality of instructions.

7. The apparatus of claim 5, wherein when said plurality of instructions fetched by said instruction fetch means includes a delayed instruction which cannot be invalidated by said present instruction invalidation means even when it is located after the instruction location of said predicted branch instruction for said presently fetched plurality of instructions and said delayed instruction is actually a branch instruction, said instruction fetch means fetches said delayed instruction which is actually said branch instruction and all the instructions of said presently fetched plurality of instructions which are located after said delayed instruction which is actually said branch instruction at the next processing timing.

8. The apparatus of claim 1, wherein said instruction fetch means fetches said plurality of instructions sequentially according to addresses of instructions, in a case in which the address of said presently fetched group of instructions originates from another address, and in which said predicted branch instruction for said presently fetched group of instructions which is registered in said one entry in said branch prediction table has said branching address which coincides with said address of said presently fetched group of instructions, and the registered instruction location corresponding to said branching address which coincides with said address of said presently fetched plurality of instructions is before an instruction position of said another address from which said address of said presently fetched plurality of instructions originates.

9. The apparatus of claim 1, wherein said branch prediction table means comprises an associative memory.

10. An apparatus for branch prediction, comprising:
processor means for executing instructions;
a branch prediction table, formed by an associative memory, for registering entries, each entry including a branching address indicating instructions to be executed concurrently containing a predicted branch instruction, and an entry address indicating a location of said each entry in said associative memory of said branch prediction table;
instruction fetch means for fetching said instructions to be executed concurrently by said processor means by fetching said instructions indicated by said branch target address of said predicted branch instruction for the presently fetched instructions at a next processing timing, wherein said predicted branch instruction for said presently fetched instructions is registered in one entry in said branch prediction table having the branching address which coincides with an address of said presently fetched instructions;
prediction judging means for judging the predicted branch instruction for said presently fetched instructions as correct when said predicted branch instruction is actually encountered during actual execution of said presently fetched instruction;
predicted instruction invalidation means for invalidating instructions indicated by said branch target address of said predicted branch instruction for said presently fetched instructions which are fetched by said instruction fetch means at the next processing timing, when said prediction judging means does not judge said predicted branch instruction as correct; and
table registration means for rewriting said entry registering said predicted branch instruction for said presently fetched instructions in said branch prediction table when said prediction judging means does not judge said predicted branch instruction as correct, by using the entry address of said entry registering said predicted branch instruction for said presently fetched instructions.

11. The apparatus of claim 10, wherein said table registration means also registers as a new entry an actual branch instruction for said presently fetched instructions in said branch prediction table when an actual branch prediction encountered during said actual execution of said presently fetched instructions is not registered in said branch prediction table, where said table registration means registers said new entry by using a new entry address which is presently not used in said branch prediction table.

12. The apparatus of claim 10, further comprising means for supplying the entry address of said entry registering said predicted branch instruction for said presently fetched instructions by storing said entry address of said entry registering said predicted branch instruction for said presently fetched instructions until a rewriting of said entry registering said predicted branch instruction for said presently fetched instructions is carried out by said table registration means.

13. The apparatus of claim 10, wherein said table registration means does not rewrite said entry registering said predicted branch instruction for said presently fetched instructions in said branch prediction table even when said prediction judging means does not judge said predicted branch instruction as correct as long as an actual branch instruction encountered during actual execution of said presently fetched instructions is fetched at an identical processing timing at which a registration by said table registration means is carried out.

14. The apparatus of claim 10, wherein each entry in said branch prediction table means further includes a valid bit indicating a validity of each entry in said branch prediction table means.

15. The apparatus of claim 14, wherein said valid bit of each entry in said branch prediction table indicates an entry as invalid when the predicted branch instruction of said entry is not actually taken during execution of said predicted branch instruction.

16. The apparatus of claim 14, further comprising cache memory means for storing said instructions to be fetched by said instruction fetch means, wherein said valid bit of an entry in said branch prediction table means indicates the entry as invalid when an instruction having an address which coincides with the branching address of said entry is not present in said cache memory means.

17. The apparatus of claim 14, wherein said table registration means also registers as a new entry an actual branch instruction for said presently fetched instructions in said branch prediction table when said actual branch prediction encountered during actual execution of said presently fetched instructions is not registered in said branch prediction table means, where said table registration means registers said new entry by overwriting an entry with said valid bit indicating said entry is valid.

18. The apparatus of claim 10, wherein said processor means executes said plurality of instructions concurrently, said instruction fetch means fetches said plurality of instructions at each processing time, and each entry in said branch prediction table further includes an instruction location indicating a location of said predicted branch instruction in said plurality of instructions indicated by said branching address.

19. The apparatus of claim 18, wherein said instruction fetch means fetches instructions sequentially according to addresses of instructions, except for a case in which said predicted branch instruction for said presently fetched instructions which is registered in an entry in said branch prediction table having branching address which coincides with an address of said presently fetched instructions and the instructions indicated by said branch target address of said predicted branch instruction for said presently fetched instructions does not include another predicted branch instruction registered in another entry in said branch prediction table having another branching address which is before said branch target address of said predicted branch instruction for said presently fetched instructions.

20. A method of branch prediction for a processor capable of executing a plurality of instructions concurrently, comprising the steps of:

providing a branch prediction table for registering entries, each entry including a branching address indicating said plurality of instructions containing a predicted branch instruction, a branch target address of said predicated branch instruction, and an instruction location indicating a location of said predicted branch instruction in said plurality of instructions indicated by said branching address;

fetching said plurality of instructions to be executed concurrently by said processor which are indicated by said branch target address of said predicted branch instruction for the presently fetched plurality of instructions at a next processing timing, where said predicted branch instruction for said presently fetched plurality of instructions is registered in one entry in branch prediction table having said branching address which coincides with an address of said presently fetched plurality of instructions;

actually executing said plurality of instructions fetched by said processor concurrently;

judging said predicted branch instruction for said presently fetched group of instructions as correct when said predicted branch instruction is actually encountered during actual execution of said presently fetched plurality of instructions; and invalidating said plurality of instructions indicated by said branch target address of said predicted branch instruction for said presently fetched plurality of instructions which are fetched at the next processing timing, when said predicted branch instruction is not judged as correct.

21. A method of branch prediction, comprising the steps of:

providing a branch prediction table formed by an associative memory for registering entries, each entry including a branching address indicating instructions to be executed concurrently containing a predicted branch instruction, a branch target address of said predicated branch instruction, and an entry address indicating a location of each entry in said associative memory of said branch prediction table;

fetching said instructions to be executed concurrently by a processor which are indicated by said branch target address of said predicted branch instruction for the presently fetched instructions at a next processing timing, where said predicted branch instruction for said presently fetched instructions is registered in one entry in said branch prediction table having the branching address which coincides with an address of said presently fetched instructions;

actually executing said instructions fetched by said processor concurrently;

judging said predicted branch instruction for said presently fetched instructions as correct when said predicted branch instruction is actually encountered during actual execution of said presently fetched instructions;

invalidating said instructions indicated by said branch target address of said predicted branch instruction for said presently fetched instructions which are fetched at the next processing timing, when said predicted branch instruction is not judged as correct; and rewriting said entry registering said predicted branch instruction for said presently fetched instructions in said branch prediction table when said predicted branch instruction is not judged as correct, by using said entry address of said entry registering said predicted branch instruction for said presently fetched instructions.

* * * * *